(12) United States Patent
Callahan

(10) Patent No.: US 12,110,217 B2
(45) Date of Patent: Oct. 8, 2024

(54) CHAIN MOTOR POWER DISTRIBUTION AND CONTROL

(71) Applicant: Michael Callahan, New York, NY (US)

(72) Inventor: Michael Callahan, New York, NY (US)

( * ) Notice: Subject to any disclaimer, the term of this patent is extended or adjusted under 35 U.S.C. 154(b) by 365 days.

(21) Appl. No.: 17/750,541

(22) Filed: May 23, 2022

(65) Prior Publication Data

US 2022/0324682 A1 Oct. 13, 2022

Related U.S. Application Data

(63) Continuation-in-part of application No. 17/181,179, filed on Feb. 22, 2021, now Pat. No. 11,359,374.

(60) Provisional application No. 62/979,762, filed on Feb. 21, 2020.

(51) Int. Cl.
| | |
|---|---|
| *H02P 27/04* | (2016.01) |
| *B66D 1/12* | (2006.01) |
| *B66D 1/46* | (2006.01) |
| *H02M 5/14* | (2006.01) |

(52) U.S. Cl.
CPC ............ *B66D 1/12* (2013.01); *B66D 1/46* (2013.01); *H02M 5/14* (2013.01); *B66D 2700/0141* (2013.01)

(58) Field of Classification Search
CPC ............. B66D 1/12; B66D 1/46; H02M 5/14
USPC .......................................................... 318/801
See application file for complete search history.

(56) References Cited

U.S. PATENT DOCUMENTS

| | | |
|---|---|---|
| 2,711,180 A | 6/1955 | Sims et al. |
| 2,790,524 A | 4/1957 | Herrschaft |
| 3,077,009 A | 2/1963 | Taber et al. |
| 3,562,994 A | 2/1971 | Von Linsowe |
| 3,604,166 A | 9/1971 | Ciccarelli |
| 4,269,384 A | 5/1981 | Saeed et al. |
| 4,644,628 A | 2/1987 | Coppa |
| 5,307,598 A | 5/1994 | West |
| 5,333,420 A | 8/1994 | Eden |
| 5,335,468 A | 8/1994 | Oberman et al. |
| 5,390,463 A | 2/1995 | Sollner |
| 5,429,417 A | 7/1995 | Kim |
| 6,332,298 B1 | 12/2001 | Bigelow |
| 6,658,798 B1 | 12/2003 | Frerichs et al. |

(Continued)

FOREIGN PATENT DOCUMENTS

DE 362627 C 10/1922

*Primary Examiner* — Erick D Glass
(74) *Attorney, Agent, or Firm* — Davidson Kappel LLC

(57) ABSTRACT

Units for distributing three-phase power to a plurality of chain motors are provided, as are used to raise and suspend production elements such as lighting, sound, video, and scenery. Remote switching and phase reversal of such power are also provided. In the prior art, such switching has been performed by large, heavy contactors inserted between the single power input and its distribution to plural outputs for motors, making the unit difficult to handle and ship. Provided herein are power switching and phase reversal performed by a plurality of parallel such means, reducing the current requirements for each, and thereby the size, weight, and cost of the whole. In some embodiments, the single power input is replaced by a by a cable delivering a plurality of two-phase circuits to the unit which derives the three-phase circuits necessary for chain motors therefrom.

2 Claims, 50 Drawing Sheets

(56) References Cited

U.S. PATENT DOCUMENTS

| | | | |
|---|---|---|---|
| 6,682,253 | B2 | 1/2004 | Binna et al. |
| 7,197,856 | B2 | 4/2007 | Coles |
| 8,142,047 | B2 | 3/2012 | Acampora et al. |
| 8,671,627 | B2 | 3/2014 | Marshall |
| 8,905,274 | B2 | 12/2014 | Sibiet |
| 9,115,504 | B2 | 8/2015 | Wallance |
| 9,382,714 | B2 | 7/2016 | Richardson |
| 9,850,654 | B2 | 12/2017 | Shalev |
| 10,267,056 | B1 | 4/2019 | Eastland |
| 10,344,494 | B2 | 7/2019 | Volin |
| 10,626,611 | B2 | 4/2020 | Thrall et al. |
| 10,760,263 | B2 | 9/2020 | Hossler et al. |
| 2004/0187426 | A1 | 9/2004 | Callahan |
| 2006/0096228 | A1 | 5/2006 | Chen |
| 2007/0035978 | A1* | 2/2007 | Newman ................. H02M 1/36 363/148 |
| 2013/0057182 | A1* | 3/2013 | Juan ....................... B60L 50/52 310/68 R |
| 2019/0077642 | A1* | 3/2019 | Huang .................... H02H 3/006 |

\* cited by examiner

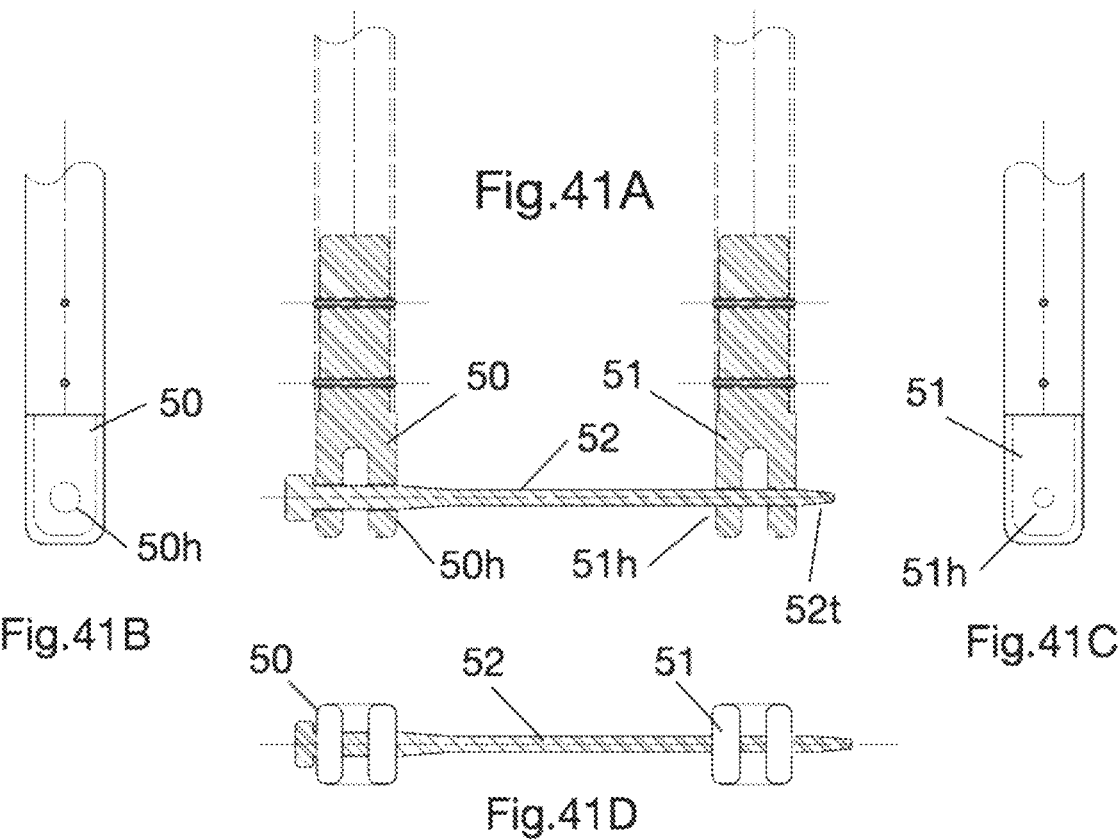

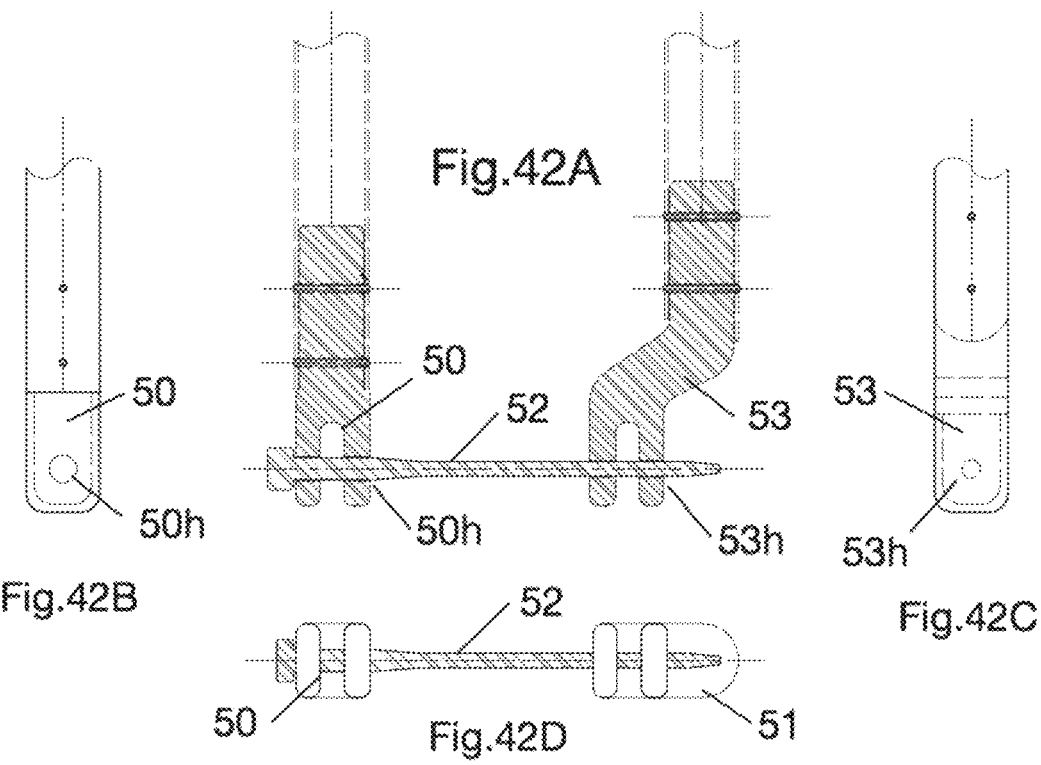

72UL

72UL
72H

CHAIN MOTOR POWER DISTRIBUTION AND CONTROL

This application is a continuation-in-part of U.S. Ser. No. 17/181,179, filed Feb. 22, 2021, which claims priority to U.S. Provisional Application Ser. No. 62/979,762, filed Feb. 21, 2020, the entire disclosure of which is hereby incorporated by reference.

This application is related to U.S. Provisional Application No. 61/973,592, filed Apr. 1, 2014; U.S. Utility application Ser. No. 14/676,616, filed Apr. 1, 2015; Utility application Ser. No. 15/614,902, filed Jun. 6, 2017; U.S. Utility application Ser. No. 15/945,987, filed Apr. 5, 2018; U.S. Provisional Application No. 62/743,095, filed Oct. 9, 2018; U.S. Utility application Ser. No. 16/253,620, filed Jan. 22, 2019; U.S. Utility application Ser. No. 16/596,002, filed Oct. 9, 2019; U.S. Utility application Ser. No. 17/069,054, filed Oct. 13, 2020; U.S. Utility application Ser. No. 17/508,194, filed Oct. 22, 2021; and U.S. Utility application Ser. No. 17/508,209, filed Oct. 22, 2021, the entire disclosures of the following, which are hereby incorporated by reference

BACKGROUND OF THE INVENTION

"Chain motors" (also "chain hoists"), originally designed for lifting objects in industrial applications, were in the 1970s widely adopted by the entertainment industry to raise and suspend during use, lighting, scenery, speakers, screens, cabling, and other production elements in buildings lacking traditional "fly systems" for the purpose. A modern concert tour of sports arenas can travel with upwards of one hundred such motors, to suspend in a matter of hours more than 100,000 lbs. of production elements from a building's roof structure.

Each motor must be provided with AC power for its operation, typically a three-phase 120/208-volt circuit. In some cases, motors are actuated by applying power to them, with the direction of chain travel determined by the rotation of phases. More commonly, power relays are mounted inside the motor, such that multiple motors can share the same AC supply and each motor can be operated independently by switch closures, both local and remotely via low current wiring.

Distribution of power to and remote control of such motors have long been performed by specialist "distros", which accept a three-phase AC power input in the range of 30-60 amperes, dividing it (protected by branch circuit breakers) among, typically, eight outputs/motors, and offering a handheld remote control for their operation. The distro for a group of motors supporting the same large production element is often preferably mounted to that element, but distro size and weight have made difficult shipping them still attached. That size and weight have been a consequence of the large power contactors used for remotely switching power and reversing phase rotation.

The three-phase 30-60 A supply required by prior art distros also has no commonality with the branch circuit needs of other power consumers in the same production, requiring specialist cables and distribution.

And, such distros have lacked features improving the safety and efficiency of chain motor use.

SUMMARY OF THE INVENTION

By contrast, disclosed herein is power switching and phase reversal at the distro subsequent to its branch circuit protection, reducing the device current rating necessary. This yields a disproportionate reduction in the size, weight, and cost of components. Thus, while a larger number of relays are required by the plurality of branch circuits, the result is still a substantial reduction in total distro size and weight. Benefits of a smaller, lighter "distro" include improvements in handling, and the practicality of shipping them pre-installed in trusses and other production elements, markedly reducing the time and labor necessary onsite.

In another aspect, an improved chain motor distro is disclosed which accepts six two-phase circuits of a lower amperage, as are supplied by an industry standard "Soco" multi-cable, deriving from them the three-phase circuits necessary for chain motor operation. This eliminates the specialist cables and distribution prior art chain motor distros have required.

In another aspect, improvements are disclosed for improving the safety and efficiency of chain motor operation.

BRIEF DESCRIPTION OF THE DRAWINGS

FIG. 41A is a plan view of a truss section end using a single pin to close two clevis fittings, improved using a multi-diameter pin.

FIG. 41B is a side elevation of the clevis fitting on the pin insertion side of the truss end of the prior Figure.

FIG. 41C is a side elevation of the clevis fitting on the side opposite the pin insertion side of FIG. 41A.

FIG. 41D is an end elevation of FIG. 41A.

FIG. 42A is a plan view of a truss section end using a single pin to close two clevis fittings, improved with a multi-diameter pin and an offset clevis.

FIG. 42B is a side elevation of the clevis fitting on the pin insertion side of the truss end of the prior Figure.

FIG. 42C is a side elevation of the clevis fitting on the side of opposite the pin insertion side of FIG. 42A.

FIG. 42D is an end elevation of FIG. 42A.

DETAILED DESCRIPTION

Figure 1:
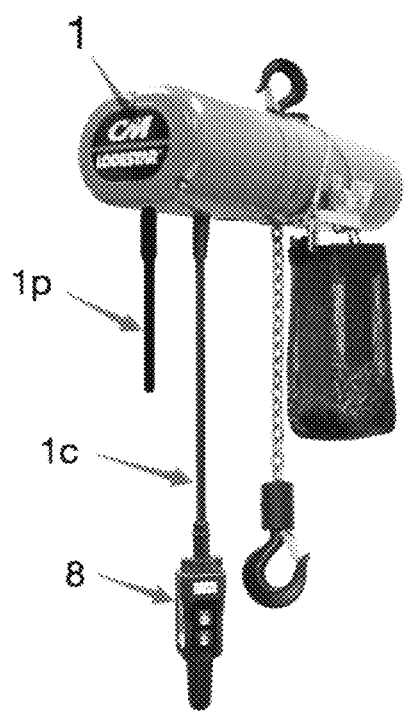
FIG. 1 illustrates a typical chain motor.

Refer now to FIG. 1, which illustrates a chain motor as manufactured by Columbus-McKinnon of Getzville, NY, the most popular U.S. brand; its "Model L", with a 1-ton lifting capacity, being its most popular model.

Chain motors require AC power for operation, typically a three-phase 120/208-volt circuit. In some cases, motors are actuated solely by applying power to them, with the direction of chain travel determined by the applied phase rotation. This, however, requires that each motor be provided with a unique circuit connecting it with power relays at another location.

More commonly, power relays are mounted inside the motor, such that multiple motors can share the same AC supply and each motor can be controlled by switch closures both locally (e.g., by "pickle" 8) and remotely via low current wiring. Motors equipped with internal relays are typically sold with a power pigtail 1p for their alternating current supply and a second pigtail 1c terminating in a "pickle" 8, which mounts pushbuttons or a rocker switch for local up/down control.

Figure 2:
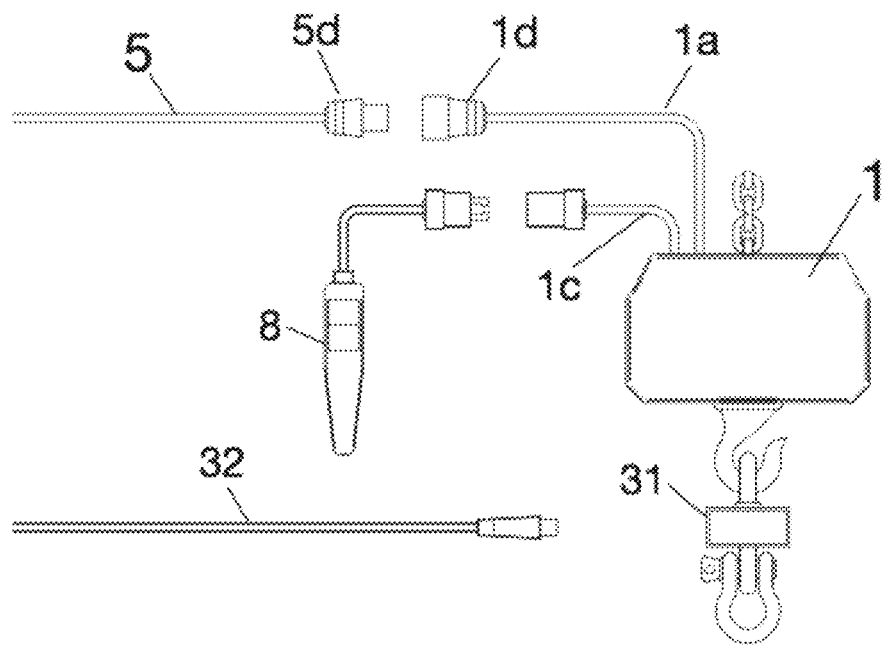
FIG. 2 illustrates an adaption of chain motors for the application.
Figure 3:
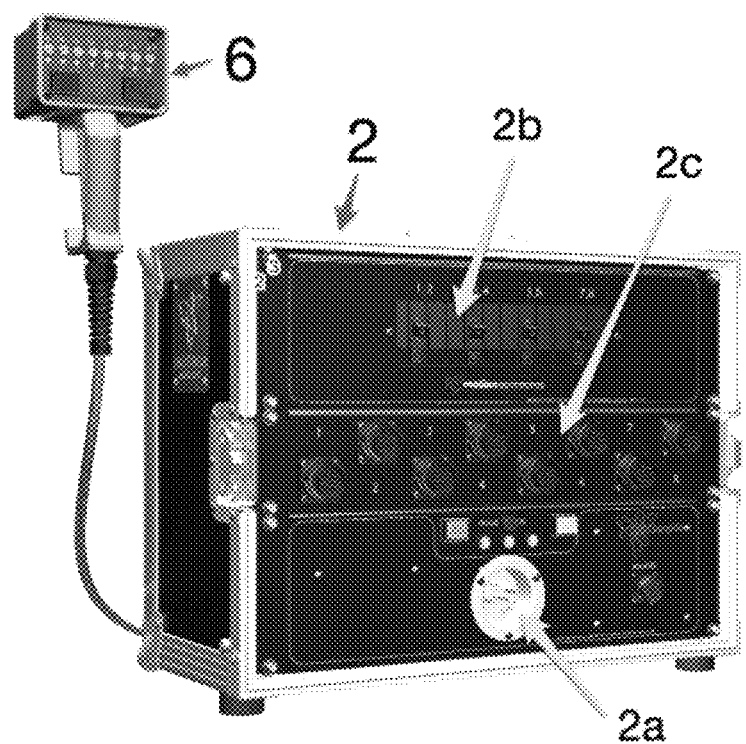
FIG. 3 illustrates a prior art "distro".
Figure 4:
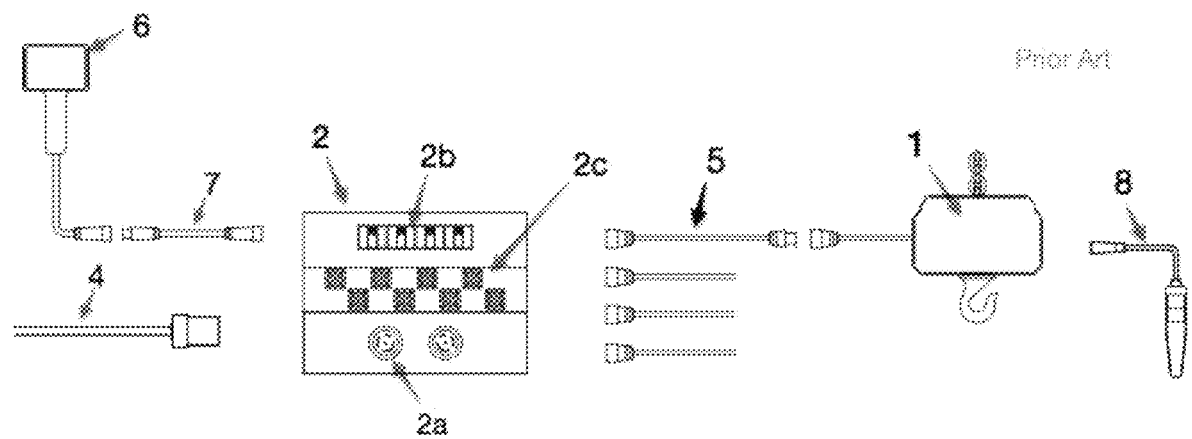
FIG. 4 illustrates connections to the distro of the prior Figure.
Figure 5:
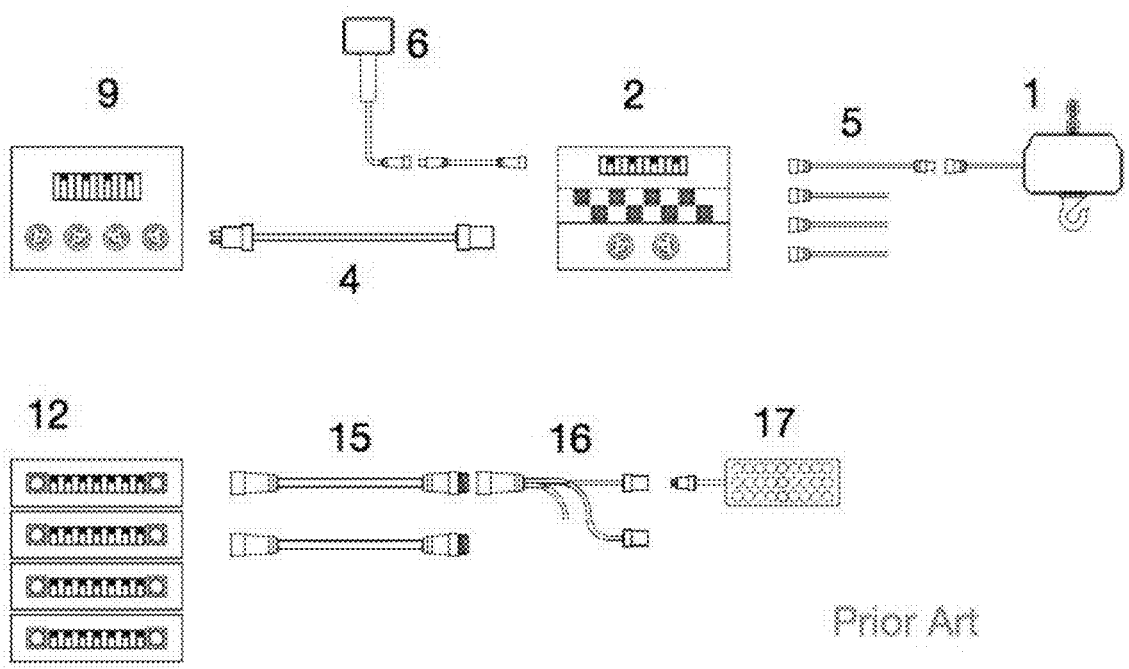
FIG. 5 illustrates prior art systems supplying power to chain motors and to other power consumers such as lighting fixtures.

Referring now to FIGS. 2, 3, and 4, in first adapting chain motors for entertainment rigging, users installed a multi-pole connector on the power pigtail (typically a 4-pole twistlock), and cut the pigtail 1c between motor 1 and "pickle" 8, installing mating connectors on the two new ends. Flexible cables connected chain motor pigtails 1a and 1c with a "distro".

To simplify cabling, most users later adopted a single motor cable 5 having conductors for both power and control, terminating in a single multi-pole connector 5d (a 7-pin "Soco" model being typical). A pigtail 1a terminating in such a connector 1d is installed on the motor 1. For local control by a pickle, the second, control pigtail 1c is retained, paralleled to the motor's relays with the multi-pole connector 1d. In other versions, a smaller connector (typically a 4-pin XLR) is mounted on a second pigtail or on the chain motor's housing for local "pickle" operation.

For decades, these specialist "distros" 2 have been built accepting a single bulk supply of three-phase alternating current (e.g., via inlet 2a) in the 30-60 ampere range, distributing it via intermediate circuit breakers 2b to receptacles 2c for, typically, eight motors. Small relays in the distro 2 remotely control the motor relays. These, in turn, are remotely controlled by switches on a handheld "pendant" 6, which is connected to the distro 2 by cable 7, so as to be readily operable from a location distant from both distro and motors.

While distro 2 can be left at ground level and individual motor cables 5 extended to the motors, in many applications this is inefficient, and users mount the distro for a group of motors supporting the same production element (for example, a truss) on that element, such that the motor cables remain local and only 30-60 A power and pendant control cables extend to the ground.

In chain motor distribution, remote switching of power to the motors is necessary for safety (to prevent unintended operation and shock hazards), as is reversing phase rotation to compensate for variations in it between different AC supplies. These functions have heretofore been performed to a distro's main power input, prior to its branch circuit breakers 2b, requiring high current contactors which are expensive and which dramatically increase the size and weight of the distribution unit. As a consequence, it is generally impractical to ship distros attached to production elements, such as trusses, or if attached, without externally mounting them, which complicates shipping and handling. Conversely, separately shipping distros requires that protective covers or shipping cases be provided, removed on site, stored, and later replaced before shipping. Externally mounting a distro atop a production element such as a truss can also complicate the laying of cable and safe passage of workers walking there.

It is one object of the invention to reduce the size and weight of a chain motor "distro" unit so as to improve efficiency in its shipping and handling, including by allowing it to remain mounted inside production elements such as trusses.

It is a further drawback of prior art chain motor distribution that the cable 4 and its connectors used in distributing 30-60 ampere power to the distros typically have no other application, complicating user inventory. Additional specialist distribution units 9 are required to produce from a main AC service, the multiple 30-60 A circuits required by multiple distros via such cables—more specialist equipment.

In FIG. 4, only prior art chain motor distribution employs the 30-60 A cable 4, and different users, including of the same brand and model distribution hardware, can have chosen different connectors for it, rendering their equipment incompatible without building adaptors.

By contrast, portable entertainment lighting has, for decades, standardized on a 19-pole "Soco" connector for multi-circuit multi-cable. First adopted in the late 1970s in England for touring entertainment lighting systems, it has since become a global standard, and been further adopted for other uses, such as in powering large LED screens.

Initially employed in North America to convey six 20-ampere 120-volt circuits, the uptake of so-called "automated" lights using discharge light sources operating on power supplies capable of accepting higher voltages (and subsequently of LED fixtures with similar power supplies such as fixture 17) encouraged an additional application of such multi-cables 15 for six phase-to-phase connected circuits, each circuit making 208 volts available, increasing the number of fixtures that can be supplied for the current rating relative to 120 volt operation.

A different type of distribution unit 12, supplies such phase-to-phase 208-volt circuits, typically accepting a 200-400 ampere three-phase main power input via known "Cam-Lok" single pole connectors, and distributes them to groups of six 208 volt circuits, each group terminated in one or more "Soco" receptacle, each circuit protected by a two-pole common-trip circuit breaker.

In a modern entertainment production, dozens of such cables supply hundreds of lighting fixtures. Others, massive video walls.

Such cables 15 and distributions 12 have never been suitable for chain motors, because they supply only two of the three necessary phases, and they lack provisions for phase reversal and remote power switching, as well as for motor control.

It is another drawback that many kinds of problem can arise in the operation of chain motors for which prior art chain motor distribution systems provide neither notice nor safety features. This includes lack of and variations in the AC power supplied at the motors, as well as other causes of motor non-operation. In one example, when a production element is supported by multiple motors, and, from one of many possible causes, only some move, a potentially hazardous situation results.

It is a further object to improve the efficiency and safety of chain motor use by integrating features in their distros detecting normal and abnormal power and operating conditions; alerting the user; and inhibiting motion under potentially unsafe circumstances.

Improved Chain Motor Distribution

Several of these long desirable objects are achieved by a radical change in approach to chain motor distribution.

As was described, remote switching and phase reversal of power have been by means of a large contactor operating on the distro's single AC input, before division between the plurality of branch circuits, each such circuit protected by a circuit breaker.

By contrast, locating power switching and phase reversal after branch circuit protection reduces the current rating necessary—yielding a disproportionate reduction in the size, weight, and cost of the components. Thus, while a larger number of relays are required because of the plurality of branch circuits each supplied with them, the result is still a substantial reduction in total distro size and weight.

Benefits of a smaller, lighter "distro" include improvements in handling and the practicality of shipping them pre-installed in trusses and other production elements, markedly reducing time and labor required onsite.

While this new approach is amenable to embodiments using prior art cables of a 30-60 A capacity, substantial further benefits are achieved by accepting multiple branch circuits already distributed and protected upstream, opening the door to the use of industry-standard "Soco" cable 15, as well as to a further reduction in the size, weight, and cost of a chain motor distro when branch circuit breakers are no longer required.

A specialist distribution unit might be designed for the upstream end of such a "Soco" cable run, providing the necessary three-phase circuits, power switching, and phase reversal.

Ideally, however, an industry standard 2-phase 208-volt distribution unit 12 could be employed—if its deficits in the application could be addressed.

Table 1 lists the circuits typically supplied by a 208-volt distribution 12.

It will be seen that although only two of the necessary three phases are present on any one circuit, that all three phases are found in four total sets across the six circuits distributed.

Thus, by employing the two phases in one of the six circuits, with a selected one of the two phases from another of the six, the three phases necessary to supply chain motor power are obtained.

TABLE 1

| PD Ckt | Phase | Motor |
| --- | --- | --- |
| 1 | X | 1 |
| 1 | Y | 1 |
| 2 | Z | 1 |
| 2 | X | 2 |
| 3 | Y | 2 |
| 3 | Z | 2 |
| 4 | X | 3 |
| 4 | Y | 3 |
| 5 | Z | 3 |
| 5 | X | 4 |

TABLE 1-continued

| PD Ckt | Phase | Motor |
| --- | --- | --- |
| 6 | Y | 4 |
| 6 | Z | 4 |

Although all circuits supplied to cable 15 are protected at the 208-volt distribution 12, it will be understood that, if an electrical fault causes only one of the two-pole circuit breakers there to trip (or a user toggles it off), the result could be that at least one of the three phases supplied to downstream motor(s) and their cabling remains energized, an undesirable condition.

To that end, means are provided to insure that power is applied to all three phases of each motor output—or none.

Figure 6:
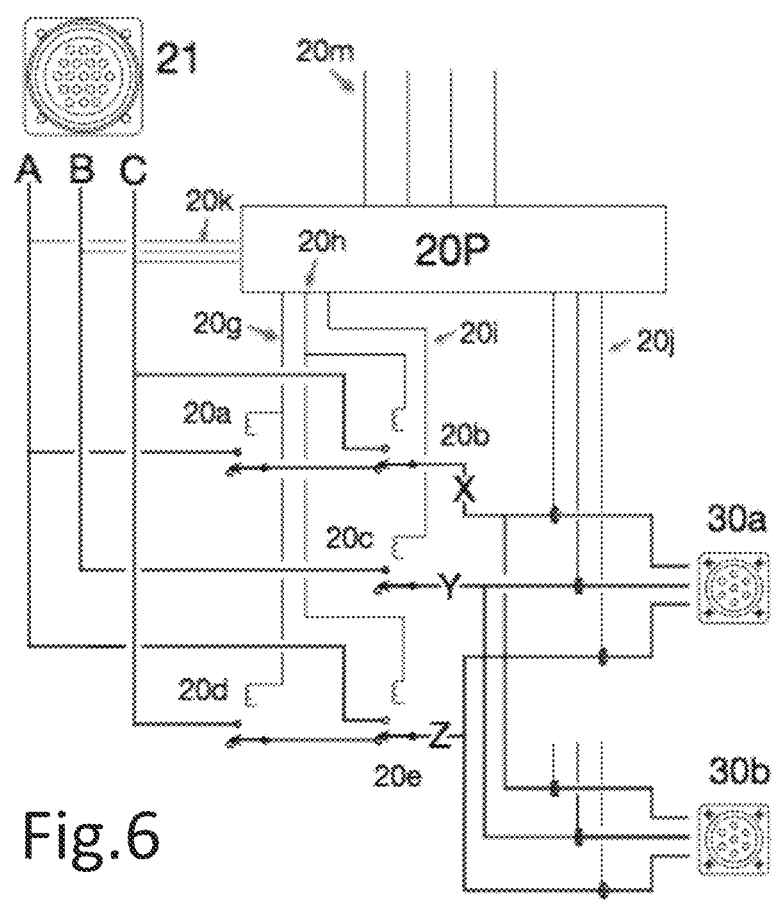
FIG. 6 illustrates one possible embodiment of the improved power control method of the present invention.

Refer now to FIG. 6, one of many possible methods.

Power relays are provided for each of the four sets of three phases received via Soco power inlet connector 21. Many configurations are possible, including the use of 3-pole relays. Here illustrated are separate single-pole relays 20a-20e for one of the four sets of three incoming phases from input Soco connector 21, representing three of the twelve energized conductors in cable 15. The relays serve to apply and remove power to the outputs to motors, here a pair of paralleled motor receptacles 30a and 30b, and to reverse their phase order. [Phases before and after the relays 20a-20e are differently lettered as the operation of the relays might, desirably, change relationships for purposes of correcting phase rotation.]

It will be seen that energizing the coil of relay 20a will connect outgoing phase X with incoming phase A. Energizing relay 20b will connect outgoing phase X with incoming phase C. Power flows to outgoing phase X only when one of relays 20a or 20b is energized. And no condition permits a shunt to form between incoming phases A and C.

Similarly, relays 20d and 20e permit connection of outgoing phase Z with either incoming phase A or C—or neither.

Energizing neither relay "safes" the downstream cabling and motors.

And relay 20c serves to connect incoming phase B with outgoing phase Y.

For illustrative purposes, the coils of relay 20a and 20d are driven in parallel by 20g. The coil of relay 20b is driven by 20h in parallel with that of relay 20e. The coil of relay 20c is driven by 20i.

Thus, energizing 20g and 20i will connect incoming phases A, B, and C to outgoing phases X, Y, and Z in that order.

Energizing 20h and 20i will connect incoming phases A, B, and C in a reversed order to compensate for a reversed AC supply.

The figure also illustrates a means sensing the presence or absence of power on the incoming phases A, B, and C. Power monitor 20p will prevent the energization of any of relays 20a-20e unless voltage is detected (via inputs 20k) on all three incoming phases A, B, and C. Thus, the derivation of the three phases for each motor from separately breakered incoming circuits is rendered safe.

Power monitor 20p (which can be provided by hardware and/or by a microcontroller) can produce an output 201, which reports if (and, optionally which) incoming phase(s) is/are missing. This can be used to alert the user. The power monitor 20p, which can be individual for each set of three phases of input or be shared in whole or part among many, can be coordinated to prevent the operation of multiple motors selected for actuation, should one or more motor be inoperative as a result of an issue. This includes when the same production element is supported by multiple motors on the same and/or multiple distros.

Improved Sensing and Coordination

Benefits can be gained by additional sensing for purposes of safety and efficiency.

Voltages can be sensed, including intermittent voltage drops as a consequence of energized motors demanding current from long cables and/or from current limited electrical services.

Continuity through the windings of a motor motor can be determined, establishing whether the electrical circuit to the motor is complete. An operator's remote control can indicate whether a motor is properly attached to each output of a given distro, such as by an LED indicator. Status reports can also be distributed by wired or wireless links to other devices.

Current can be sensed (e.g., by the illustrated current sensors on the outputs to the motor receptacles 30a and 30b via inputs 20j to power monitor 20p). The increased demand of a motor motor in operation can confirm whether a motor is, in fact, moving. An estimate of the weight on the motor can be derived from its electrical demand. In cases, for example, when an otherwise functional motor ceases operation because it has reached an internally set limit on chain travel (or markedly changes electrical demand because of a substantial change in load) the operator can be alerted and, when appropriate, motors can be stopped (including multiple motors) unless and until the condition has been deemed acceptable.

Current sensing can permit reporting inrush currents caused by faults, as well as protecting the outgoing circuits (including at less than the rating of the circuit breaker in an upstream distribution) by opening relays in the event of excessive demand. As such, a distro accepting a single power input in the 30-60 A range using prior art equipment and methods could be built without traditional circuit breakers (or if necessary for equipment listing, with fuses or other "backstop" current limiting component).

Figure 7:
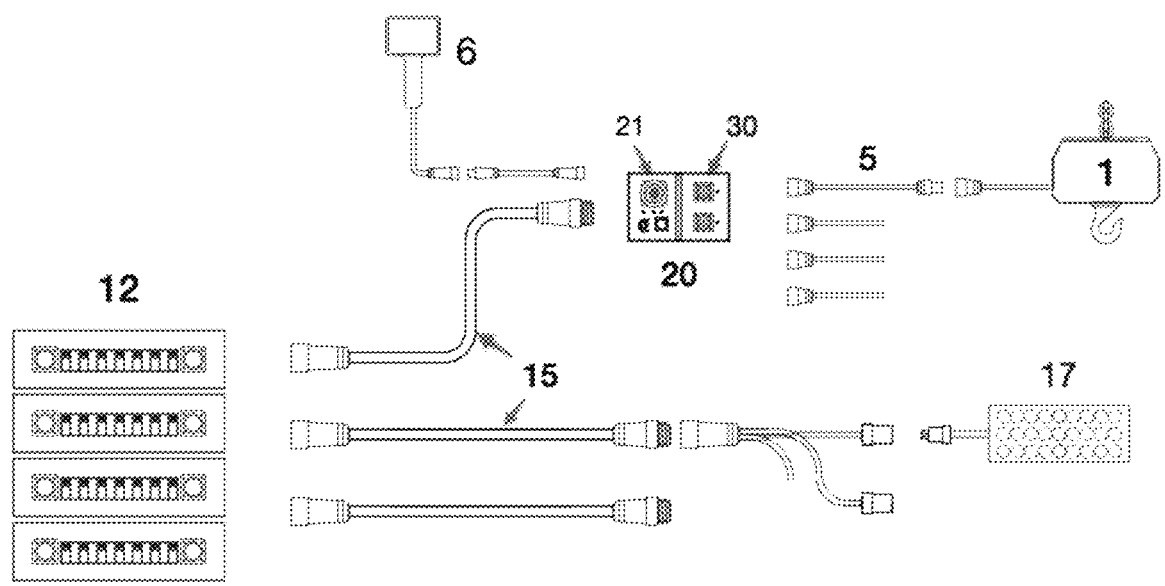
FIG. 7 illustrates the improved power control method of the present invention as it allows a unified distribution of power.

Referring now to FIG. 7, a general view of the improved chain motor distribution system made possible is illustrated.

In this example, new chain motor distribution unit 20, mounts receptacles 30 for the connection of motor cables 5. Unlike prior art distros, new unit 20 is equipped with a power inlet 21 in the form of the industry standard 19-pole "Soco" connector. As a result, new unit 20 can be supplied using standard "Soco" multi-cable 15 and from standard 208-volt distribution unit 12, such as also employed for lighting fixtures (such as LED fixture 17).

The specialized cable 4 and upstream distribution 9 required by prior art chain motor distribution are rendered unnecessary. The same cable and distributions used in quantity for lighting, video, and other purposes can also be employed in chain motor distribution. The user's inventory is simplified.

The size, weight, and cost of relays at the 20 A rating are a fraction, even collectively, of the large power contactors used in the prior art. Thus direct and indirect benefits flow, including a dramatic reduction in the size and weight of the distribution unit, permitting the smaller distro 20 to remain mounted inside trusses during transport, not requiring special handling or additional operations onsite.

Figure 8:
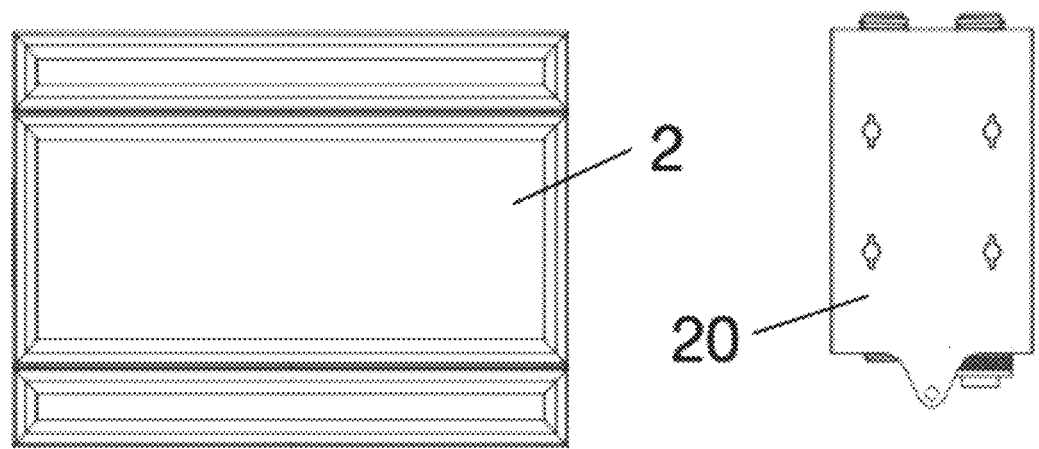
FIG. 8 compares in plan view an example reduction in distro size produced by the improved power control method of the present invention.
Figure 9:
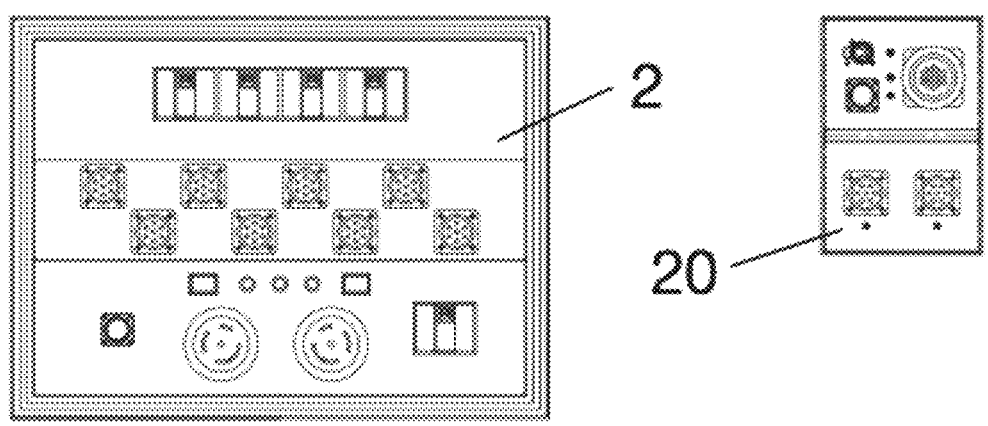
FIG. 9 compares in end view an example reduction in distro size produced by the improved power control method of the present invention.
Figure 10:
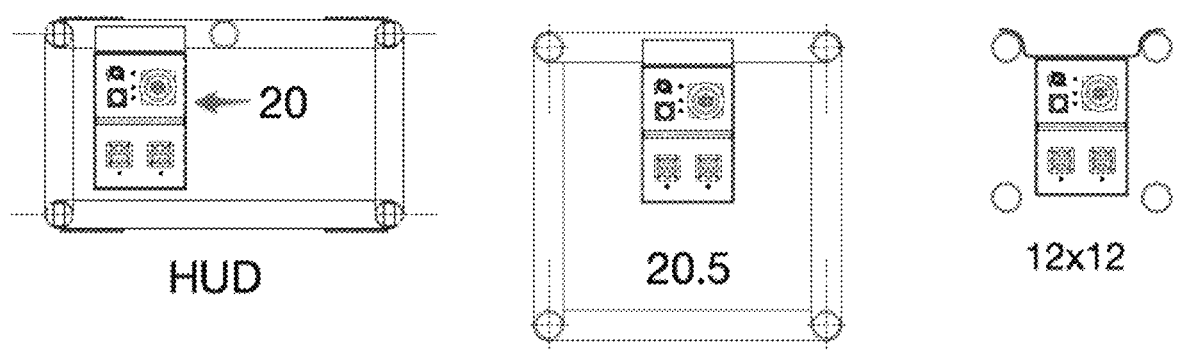
FIG. 10 illustrates in end view the improved distro of the prior Figures as its reduced size allows accommodation and shipping inside several truss types in common use.

FIGS. 8 and 9 compare size with the industry's best-known eight motor distribution unit:

FIG. 10 demonstrates that internal accommodation inside various truss profiles in common use becomes practical.

A wide variety of physical packages become possible, including those using modular components to assemble a range of configurations. To minimize unit size, more than one enclosure can be offered to accommodate the various configurations.

Figure 11:
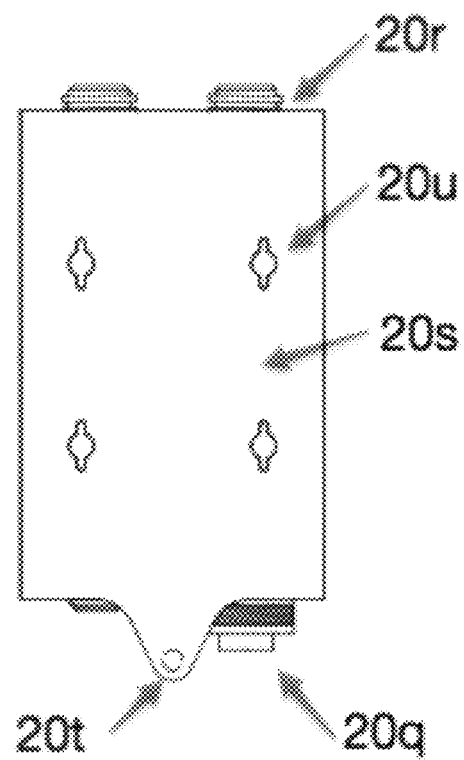
FIG. 11 illustrates in plan view in a smaller one of a plurality of chassis sizes the example improved distro of the prior Figures.
Figure 12:
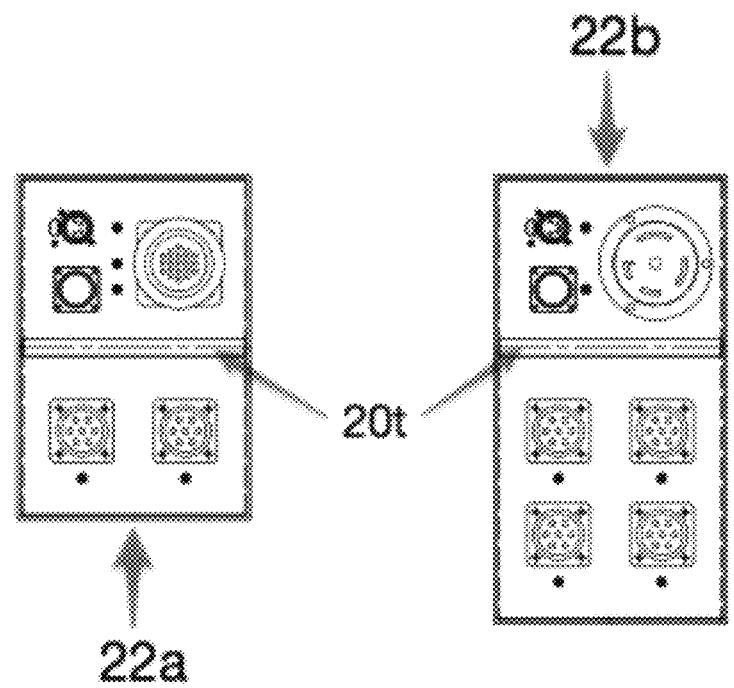
FIG. 12 illustrates in a larger one of a plurality of chassis sizes the example improved distro of the prior Figures.

Referring for examples to FIGS. 11 and 12, where two enclosure sizes 22a and 22b are offered, differing in height. In this example, the enclosure design includes at least two ends 20q and 20r mounting panels offered with different component combinations.

Enclosure end 20q is protected by handle 20t, which can serve in carrying and for attachment by a safety lanyard to a nearby structure. In the manner common in recent fixture design, enclosure sides (e.g., side 20s) are provided with receptacles 20u for known quarter-turn latches, with which clamps and other hardware used in supporting the unit can be attached.

Panels and internal assemblies can be varied, including to "feed-through", such that another distro or other power consumer can be supplied downstream.

The number of motors controlled by a unit can be varied.

Figure 13:
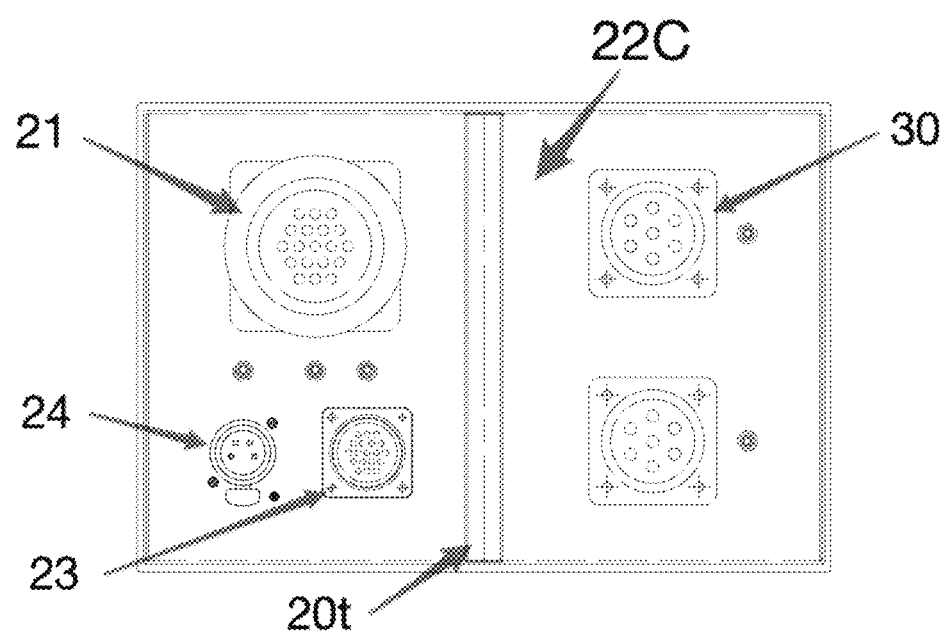
FIG. 13 illustrates an example modular panel for the smaller chassis size of the improved distro of the prior Figures including a power input and two motor outputs.
Figure 14:
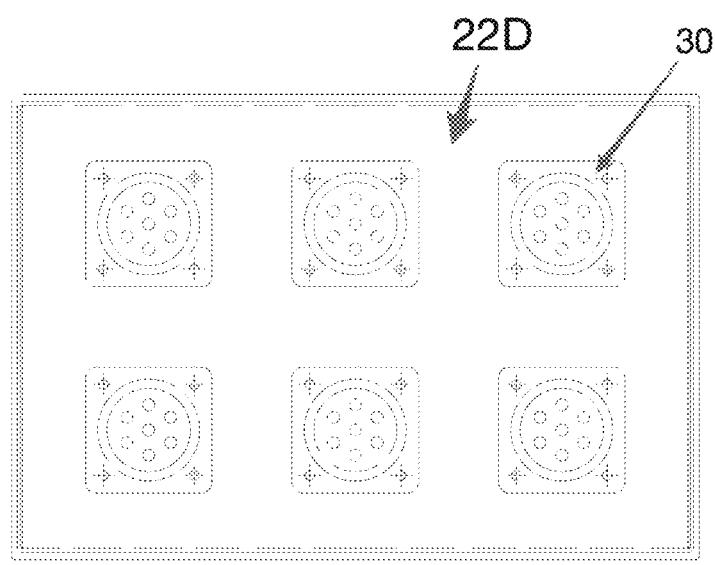
FIG. 14 illustrates an example modular panel for for the smaller chassis size of the improved distro of the prior Figures including six motor outputs.
Figure 15:
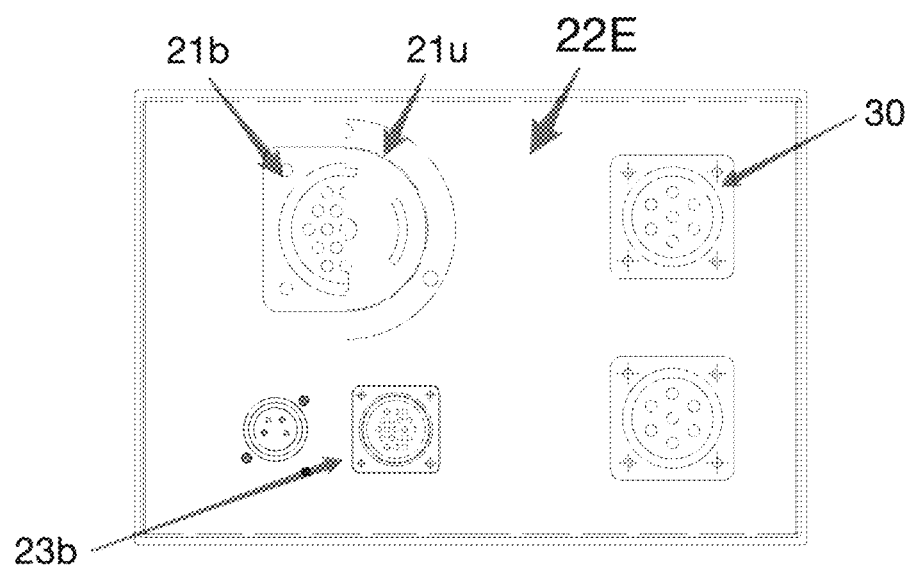
FIG. 15 illustrates an example modular panel for the improved distro of the prior Figures demonstrating the choice of input power configurations.

In this example, at least three panels are offered in the "A" size, illustrated in FIGS. 13, 14, and 15.

Panel 22C serves to input power and to connect control cables and two motors.

Panel 22D serves to connect an additional six motors, producing an "A" size distribution for eight motors.

Panel 22E is a "Thru" panel, which passes power input via Panel 22C on to additional downstream consumers. With the motor receptacles 30 on panel 22C it makes an "A" size four-motor controller. (Control for motors 5-8 inputted via receptacle 23 are then connected to the contacts for motors 1-4 on "thru" receptacle 23b.)

Panel 22E also illustrates that either Soco or 30-60 A connectors can be employed on panels depending upon unit variant.

Figure 16:
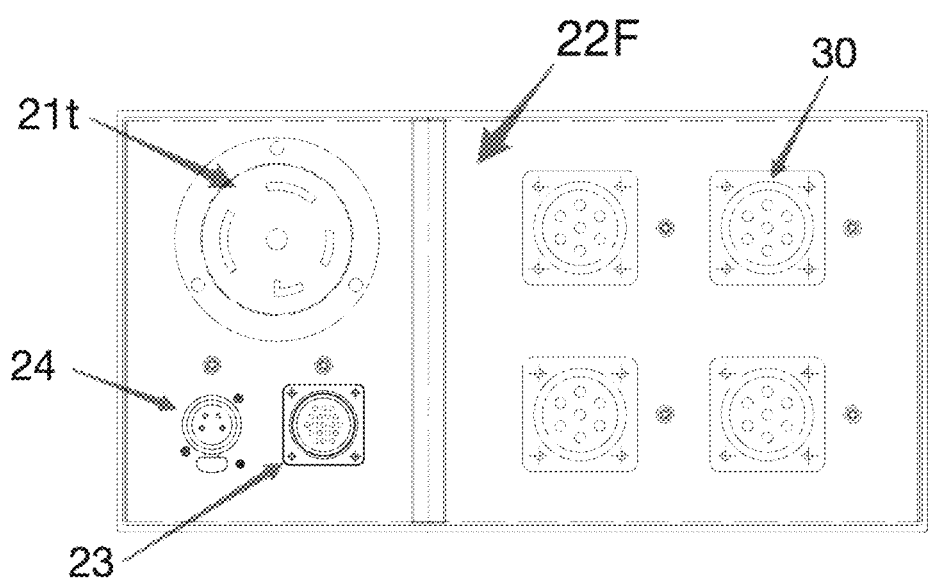
FIG. 16 illustrates an example modular panel for the larger chassis size of the improved distro of the prior Figures including a power input and four motor outputs.
Figure 17:
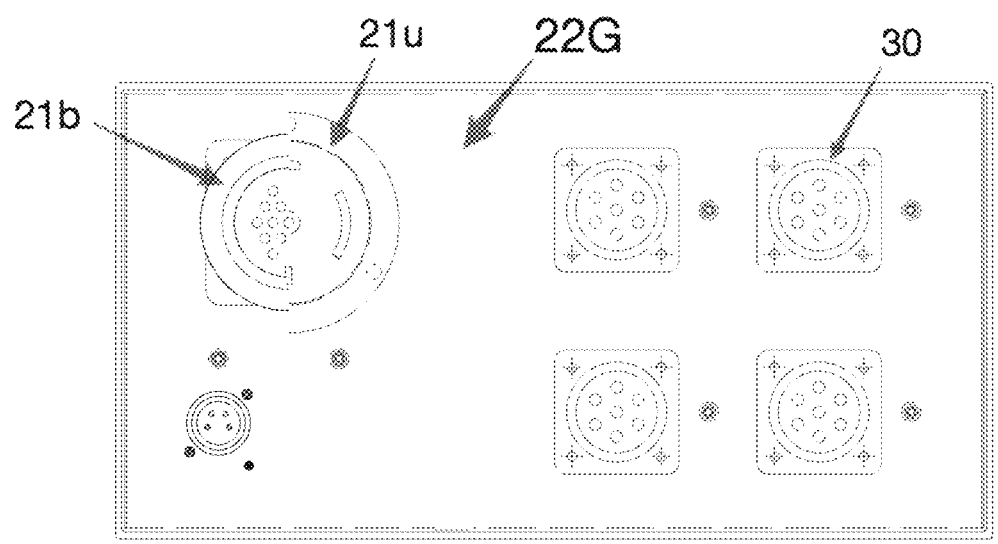
FIG. 17 illustrates an example modular panel for the larger chassis size of the improved distro of the prior Figures including four motor outputs and an optional power output.

In these FIGS. 16 and 17, two example panels are illustrated for a "B" size enclosure as an eight-motor unit having "feed-through" capability, when such is desired.

Like prior art motor distros, these figures also illustrate a miniature multi-pole connector 23 to link with a handheld "pendant" remote controller 6. In the interests of maintaining commonality with the large number of prior art distribution systems that are and will remain in use, an improved distro can be made responsive to the same cable, if not pendant, further simplifying user inventory.

User Interface

Chain motors and the components of their distribution system are spread to many different locations around a venue—and in three dimensions. Determining their condition is important to efficient set up and safe operation. Yet, little status feedback is provided by typical prior art distribution systems, and such as is provided often of little value, out of the worker's view, at a distance, and/or obstructed.

Wired or wireless transmission of condition reports to dedicated interfaces or to, for example, an app running on a smartphone, are possible, but are also limited to those persons carrying or in proximity to a compatible device.

A more widely accessible approach is the use of "beacons". In one example, high-powered multi-color LEDs shine from several sides of the same distro. Because the relative locations of a distro and a viewer (as well as the orientation of the distro itself) will differ, multi-directional illumination markedly increases the prospect that it will be seen, either directly, or (if of sufficient brightness) as it illuminates objects near the distro visible to the viewer. Different color choices and flashing/winking patterns and rates can clearly communicate status of power, enabling of motion, motor operation and direction, and alert to problems.

The design of a remote control pendant can also be improved.

For example, pendant 6 of prior art distro 2 fails to indicate whether a chain motor is, in fact, connected to a given output, much less is operable or operating. The user must await the start of a move and visually confirm that those motors selected on the pendant are all, in fact, moving and in the correct direction—before an incorrect selection and/or an issue with distro, motor, and/or cable result in a condition that could become hazardous.

Status information can be presented to the operator via a "smart pendant".

Figure 18:
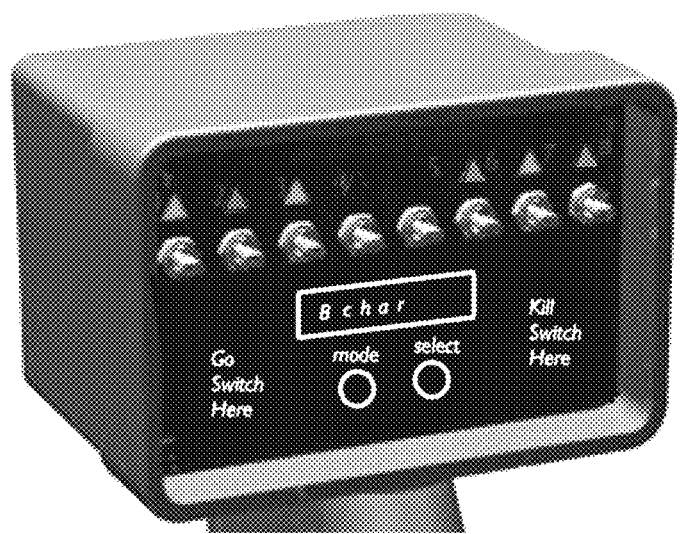
FIG. 18 illustrates the controls of an example remote control "pendant".
Figure 19:
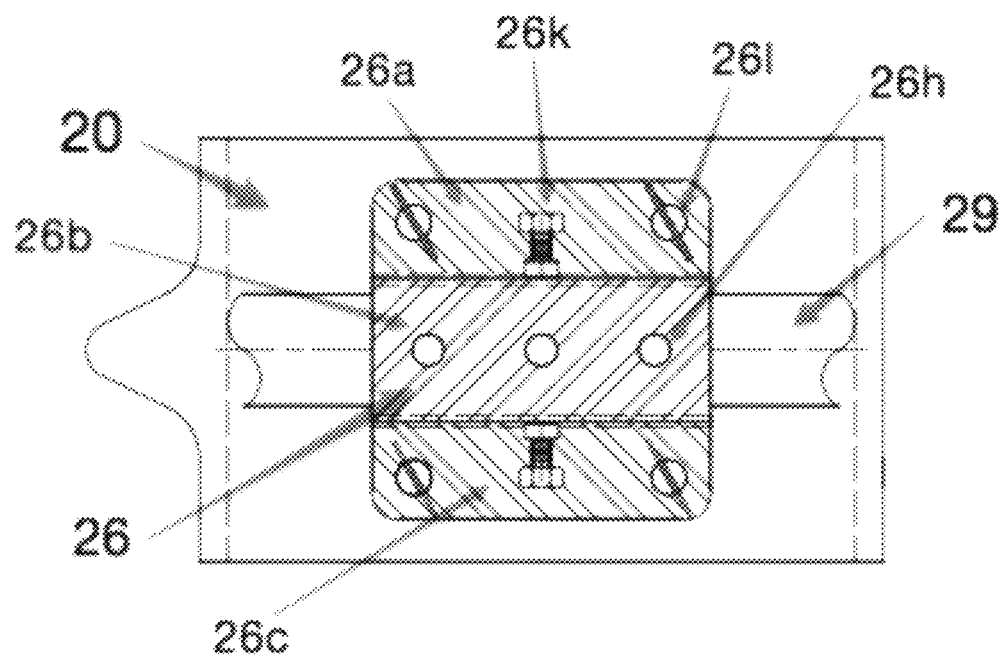
FIG. 19 is a plan view of a bracket mounting a unit to a structural member.
Figure 20:
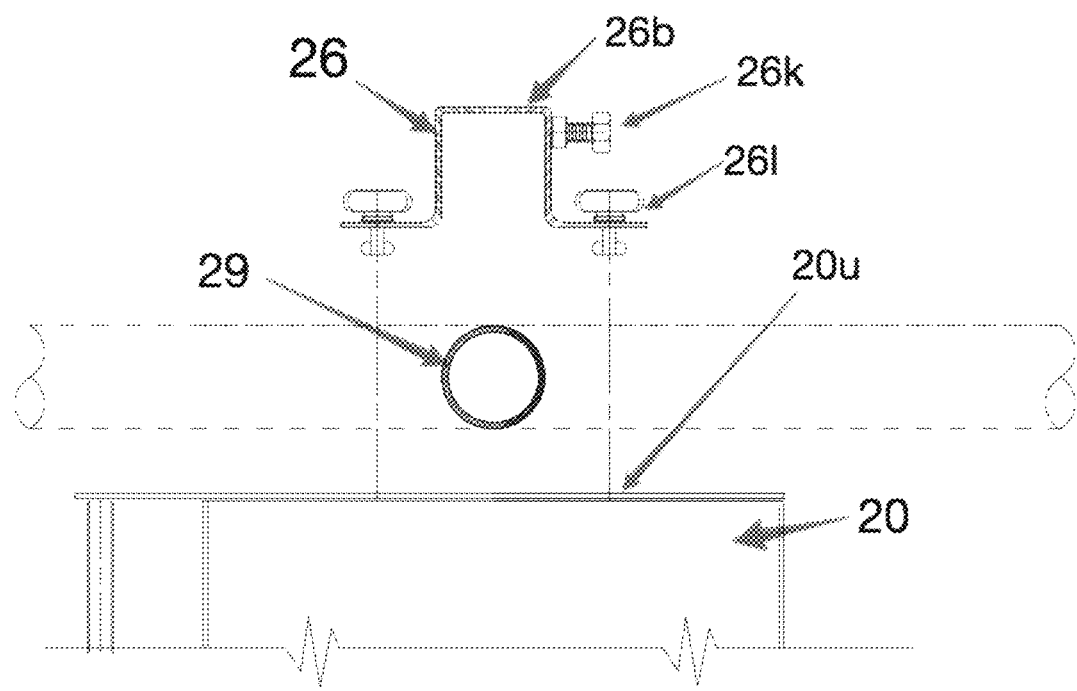
FIG. 20 is an exploded side elevation of the bracket of the prior Figure.
Figure 21:
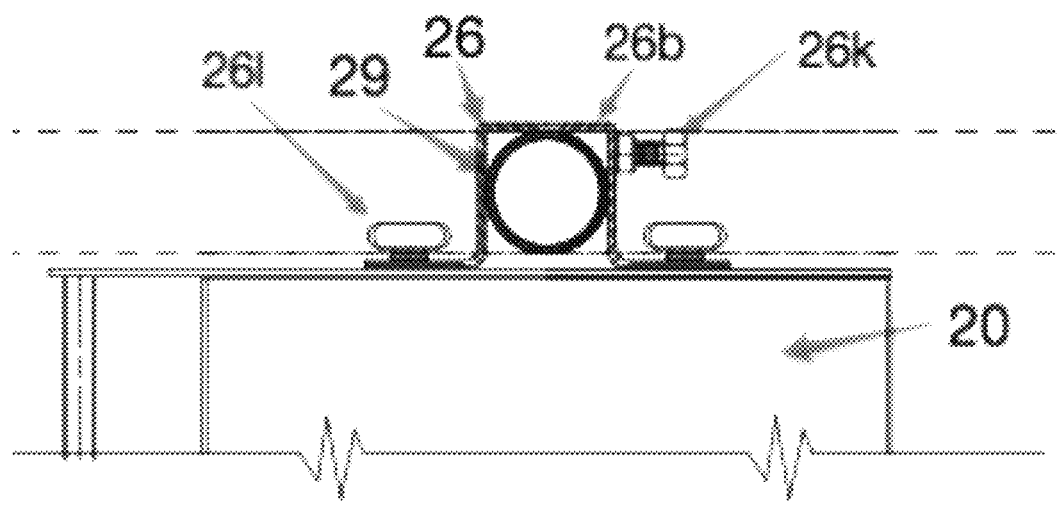
FIG. 21 is an assembled side elevation of the bracket of the prior Figures in use.
Figure 22:
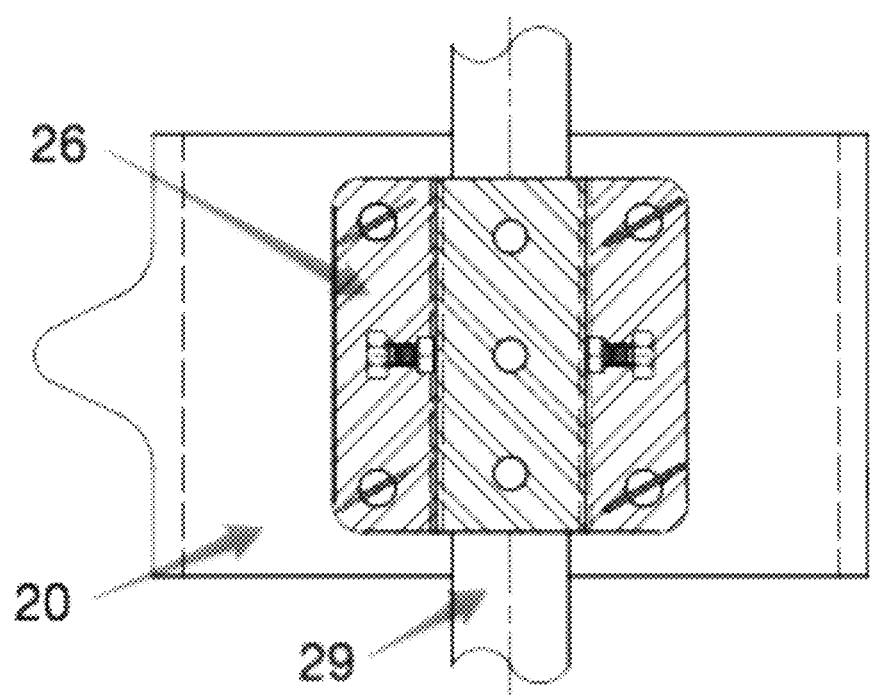
FIG. 22 is a plan view of the bracket of the prior Figures whose attachment to the unit has been rotated 90 degrees reorienting the unit with respect to the structural member.
Figure 23:
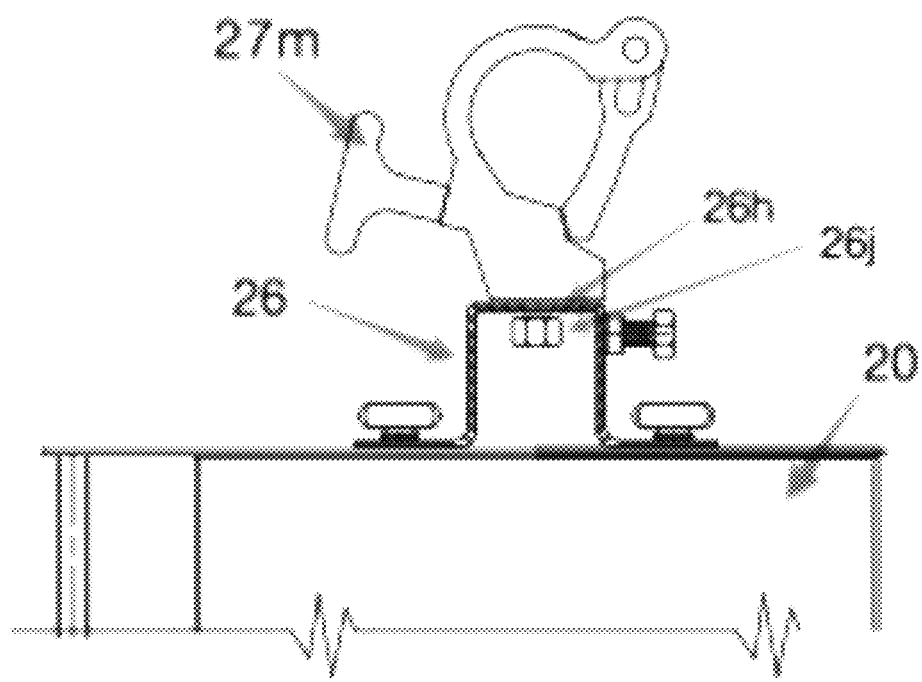
FIG. 23 is a side view of the bracket of the prior Figures illustrating attachment to it of a known fixture hanging clamp.
Figure 24:
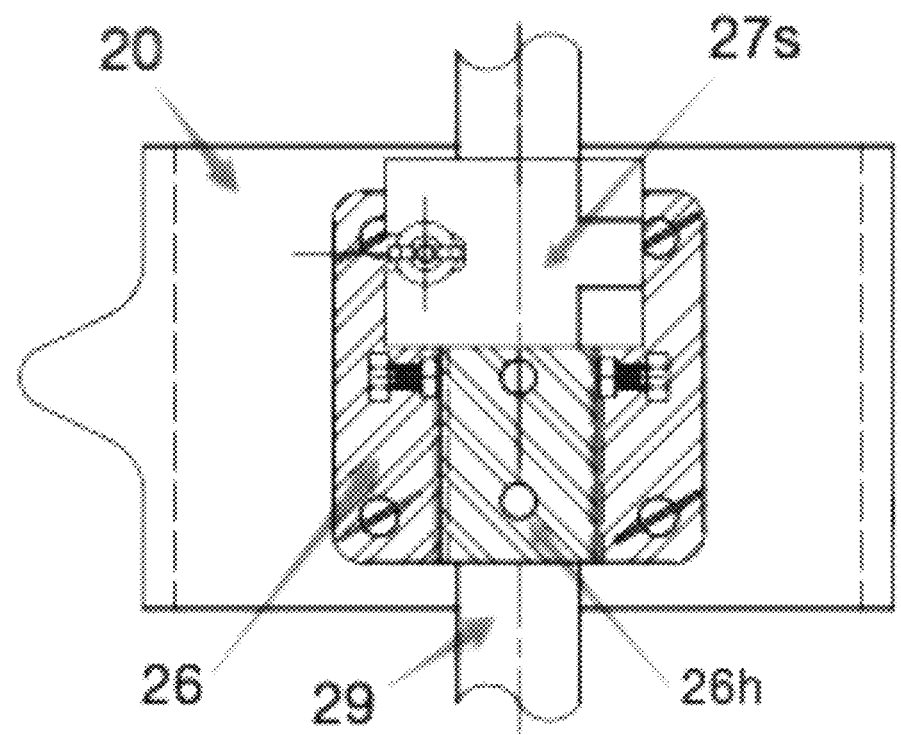
FIG. 24 is a plan view of the bracket of the prior Figures illustrating attachment of another known clamp type to it.
Figure 25:
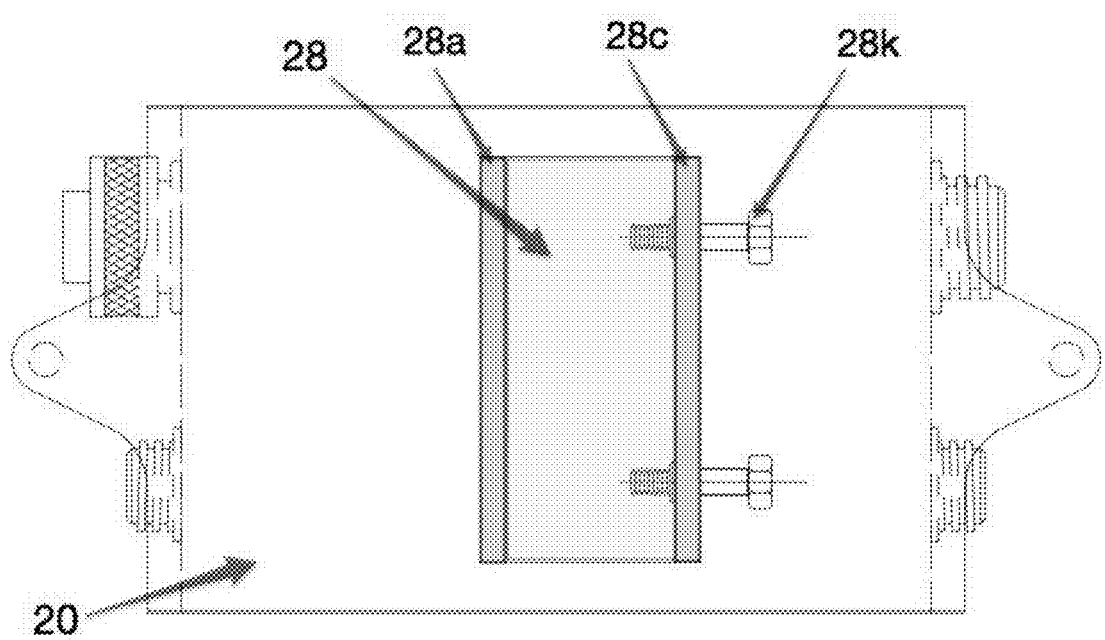
FIG. 25 is a plan view of a clamp suitable for mounting to a structural member a unit such as the improved distro of the prior Figures in use.
Figure 26:
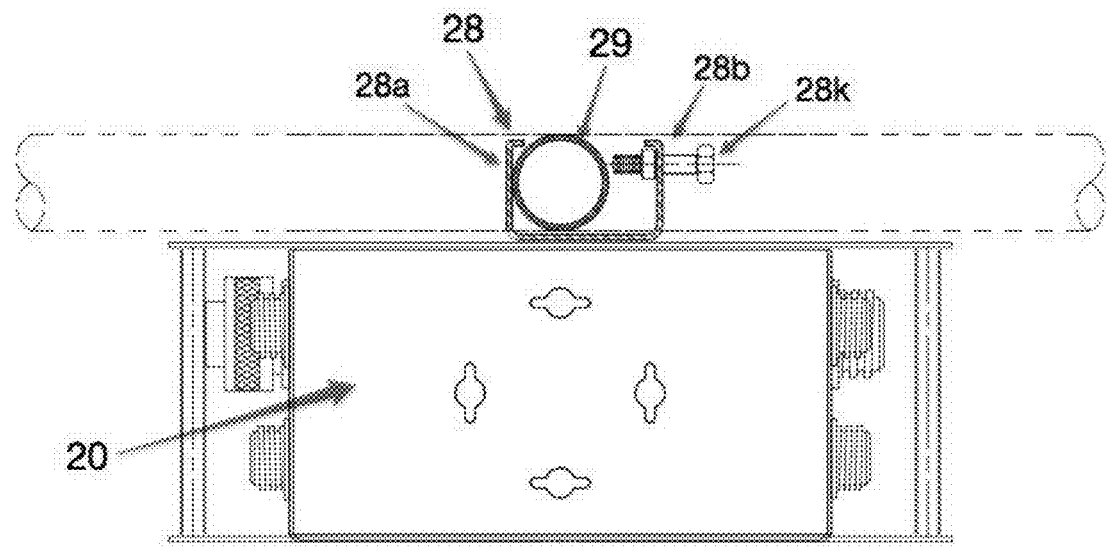
FIG. 26 is a side elevation of the bracket of the prior Figure in use.

FIG. 18 illustrates example "smart pendant" controls, housed in the same rugged industrial enclosure as the most popular prior art unit and having a similar layout.

Where the LEDs in the prior art pendant only indicate that the toggle for a motor has been switched from a neutral position to specifying up or down motion, a "smart" pendant can provide more useful visual feedback. In this illustration, the LED associated with each motor controlled by the pendant can unambiguously indicate that no motor is detected on an output; that "up" has been selected with green; and that "down" has been selected with red. Should the user select a direction for an output lacking a detected motor, the system can warn the user and prevent a "go". When a commanded move begins, feedback that a motor is, in fact, moving can produce a visual cue (such as a flashing indicator for that motor). And if a motor in a selected group ceases movement prematurely a group move can be paused and the user alerted. Conversely, if a group of motors has been identified (typically for lifting the same production element), failure of an operator to select all motors in a group for movement in the same direction can also alert the operator and require a prior confirmation.

A "smart" pendant can be made compatible with prior art pendants and their cable. The most popular prior art pendant cable offers an unused expansion conductor (as well as additional unused connector contact positions not generally wired). The expansion conductor in a prior art cable could be used for relatively low speed serial communication sufficient for conveying data.

The prior panel illustrations show another provision for wired control: 4-pin XLR receptacle 24. Among many control data distribution methods long widely employed in the entertainment industry (e.g., the DMX-512 standard) the 4-pin XLR connector was popular in linking color-changing "scrollers" (such as manufactured by Wybron, Inc of Colorado Springs, CO), combining a conductor pair for a digital control signal and a second, of heavier gauge, for low voltage power.

Using this same 4-pin cable (already in many vendor's inventory) distros can be linked with handheld displays and controllers, which they also power.

Multiple distros can be networked to shared displays and controllers, and to define large groups of motors to be monitored, controlled, and/or coordinated.

Wireless communication, DMX-512, and Ethernet can be employed.

With a Single Power Input

The benefits of the applicant's new approach have been described in the context of "pre-distribution" of bulk AC power into 20 A circuits by known 208-volt power distribution units (e.g., 12) at another location, such that multi-circuit "Soco" cables (15) can be used to supply power to a chain motor distro, eliminating the need for specialist cable in the 30-60 A range (4) and a specialist power distribution unit (9) to it.

Many benefits can also be gained by use of the new approach while accepting power in the prior art manner: a single 3-phase circuit of 30-60 A via specialist cable 4. In this case, the distribution unit needs include overcurrent protection between its 30-60 A power input for its outputs to motors.

Protection can take the form of known branch circuit breakers. The additions in size and weight are minimal, relative to the savings following from the elimination of the prior art high current contactor(s) located between the power input and such branch circuit protection.

As previously noted, sensing current demands can provide feedback as to load presence and operation, and can be used for overcurrent protection. Sensing excessive current demand can trigger use of the relays to de-energize a branch circuit/output. Unlike a physical breaker, which requires manual resetting, such electronic overcurrent sensing can be "cleared" remotely, including by a "reset" control signal or by briefly interrupting the AC supply.

Methods of Attachment

Chain motor distros require provision for attachment to other objects, typically those, like trusses, supported by the motors they supply.

Examples of several improved mounting methods will be illustrated.

To provide for both a variety of attachment methods and orientations of a unit, the example distro 20 has been illustrated with quarter-turn receptacles 20*u* for clamps or other hardware on several sides.

In this example, a braked metal plate 26 mounts captive quarter-turn latches 26*l*, which attach it to the chosen side of the enclosure.

Unlike attachment by traditional clamps, bracket 26 is a "saddle" that fits over the aluminum tubing 29 used in trusses and other structures. Importantly, unlike traditional clamps, it neither adds significantly to the vertical volume consumed by mounting distro 20, nor does it protrude significantly above the member of the truss structure 29, which protrusion would interfere in stacking truss sections for shipping and with joining sections resting on a surface. As was illustrated, the symmetrical pattern of receptacles 20*u* permits rotation of bracket 26 relative to the enclosure, to allow mounting distro 20 either aligned with or perpendicular to the tubing 29 to which it is attached.

Means can be provided to clamp bracket 26 to a tube 29, to prevent the bracket (and distro) from rotating around the long axis of the tube, here bolts (or thumbscrews) 26*k*.

Bracket 26 is also illustrated having several holes 26*h*, which allow for mounting one or more traditional clamps (e.g., 27*m* or 27*s*) to it:

Another method of attachment avoiding projections beyond the envelope of the supporting structure is illustrated below:

The combination of the return on side 28*a* of bracket 28 with the pressure of fastener 28*k* on opposing side 28*b* fixes distro 20 to tubing 29, and in a manner which will not rotate around tubing 29.

Distributed Chain Motor Control

As has been described, chain motor distribution and control have long required a wired infrastructure coupling both power and control to each motor from "distro" units. Power, received by a distro from a source upstream, is divided there among a plurality of motors. A separate low voltage cable system connects control relays in the distro to a handheld remote control pendant.

When a large structure is supported by multiple chain motors safety requires that the motors operate in sync, such that the structure is not distorted/stressed and thereby potentially damaged (as well as that the lifting capacity of individual motors and/or their associated rigging is not exceeded when loads shift among them). Referring again to FIG. 2, for this purpose, chain motors 1 can be used with a system of accessory "load cells", each measuring the weight then borne by a motor.

Although such sensors can be incorporated in the chain motor itself, generally they have been offered as a discrete unit 31, inserted in the rigging there.

Signals representing weight sensed are conveyed by cables (e.g., 32c) of a separate wired network to a processor-based device, for displaying loads and for supervising the operation of multiple motors to assure that they operate simultaneously and that safe limits are not exceeded.

Some load cell systems eliminate the wired network by using wireless transmission. Yet, all such systems compound the complexity of controlling chain motors.

With or without such load feedback, chain motor distribution can be simplified.

Figure 27:
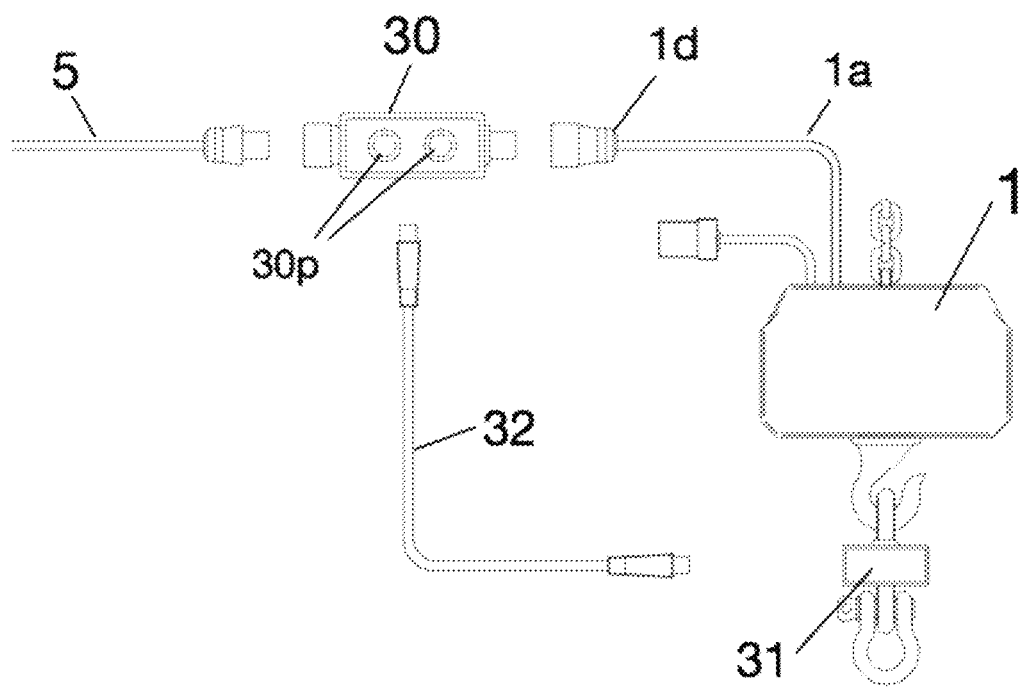
FIG. 27 illustrates one embodiment of a unit suitable for distributed control of chain motors.

In FIG. 27, a unit 30 is inserted in the existing motor cable path between a source of power and a chain motor 1. Unit 30 can be provided with a wired or wireless link to other devices, including for supervision and display. Unit 30's electronics can be powered from power supplied for the motor 1.

In one aspect, unit 30 can close the control circuit for the motor in response to a wireless command, to operate it remotely. Motors so controlled need only be supplied with AC power, with no requirement for prior art specialist distros having control relays, or for distributing wired control signals via them. A power-only 4-conductor cable can be employed.

In another aspect, unit 30 can have sensing functions, including for the presence and quality of power received, and for the presence and current demands of a motor, which it can both use in its own operation and report to other devices.

In another aspect, unit 30, being interposed in the control path, can also inhibit commanded motion should a potentially unsafe condition be detected by itself, by another such unit, and/or by central supervision.

In another aspect, the output of a load cell 31 can be coupled to the unit, both for local use (if desired) and for conveying to other devices. Conversely, a load cell having wireless capability can be adapted to provide for a unit 30 such communication.

Unit 30 can also be provided with manual controls 30p for local control of the motor, including with safeguards against accidental operation.

Unit 30 can also be configured to connect with the control pigtail or connector (e.g., 1c).

Improvements to Truss Structures

In prior related filings, various improvements to structures have been disclosed, including a truss having five parallel chords. Its "M or W" profile has many advantages, including the ability to nest sections compactly in stacking for transport or storage.

Figures 28A, 28B:
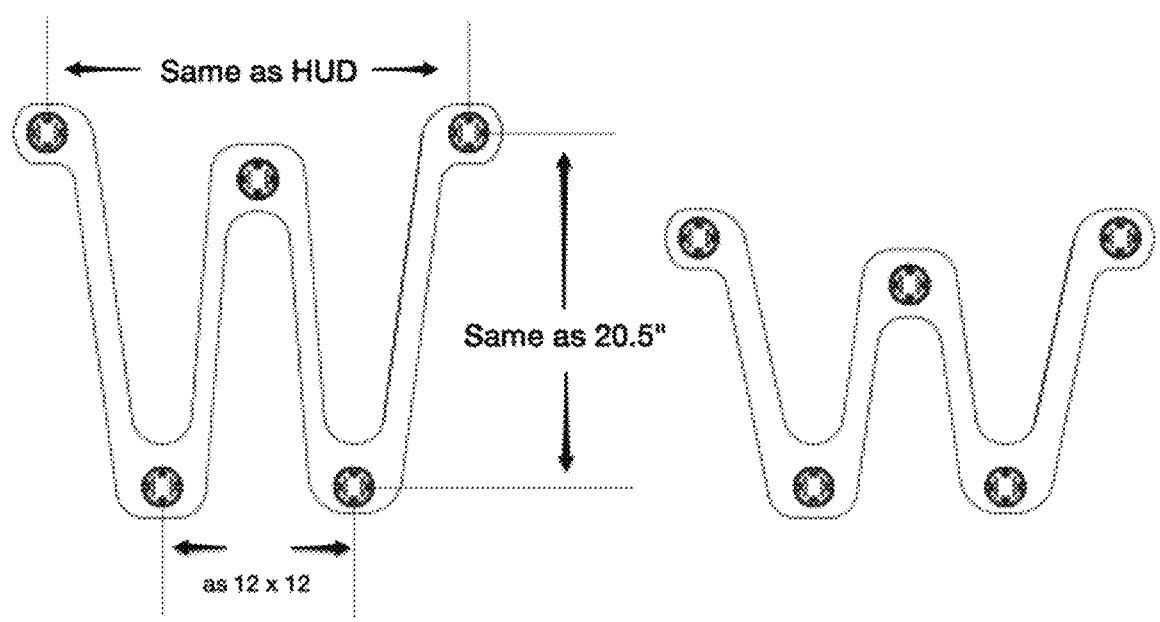
FIG. 28A is a sectional view of a five-chord truss sized to duplicate inter-chord spacings of several popular truss types.
FIG. 28B is a sectional view the five-chord truss profile of the previous Figure in a shorter height.

One such profile is shown in FIG. 28 in two possible heights, and as having chord spacings duplicating those of truss types in current use.

Figure 29:
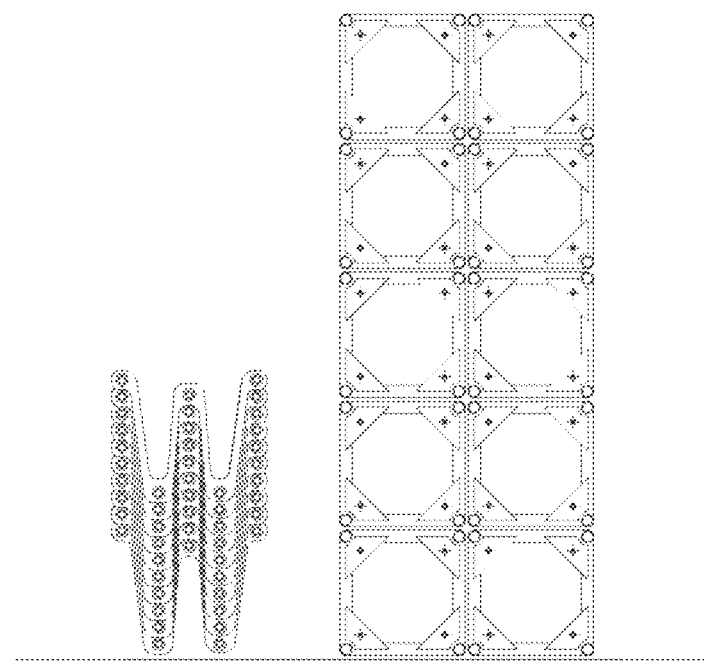
FIG. 29 compares the shipping and storage efficiency of the five-chord profile of the prior Figures with the most popular truss in use.

FIG. 29 illustrates the savings in shipping and storage space of the illustrated truss, relative to an equal quantity of the popular "20.5" type.

Various methods of forming the illustrated profile are possible.

Figure 30:
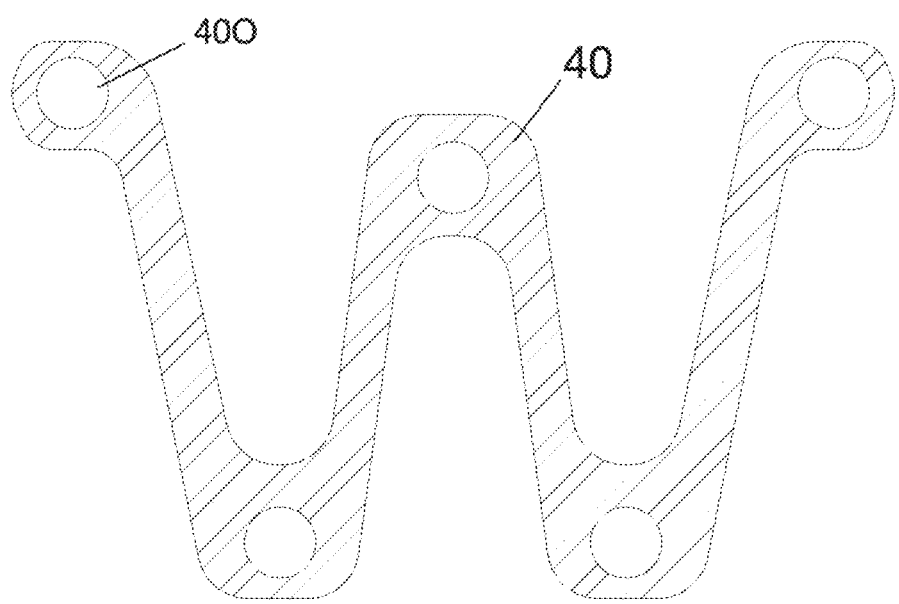
FIG. 30 illustrates a generally planar web useable in one approach to fabricating a five-chord truss.

FIG. 30 illustrates a generally planar "web" 40 having openings 40O through which the chords pass and to which they are fixed. Because web 40 extends beyond the chords, the truss will be elevated above a surface upon which it rests. Friction between the truss and floor is reduced during handling and assembly/dis-assembly of multiple truss sections in longer spans and in relocating assembled spans for attachment to rigging. The gap produced between a truss chord and the floor allows threading around the chord the "spanset" slings used to suspend a truss from chain motors, without requiring that the truss be lifted up to do so.

Figure 31:
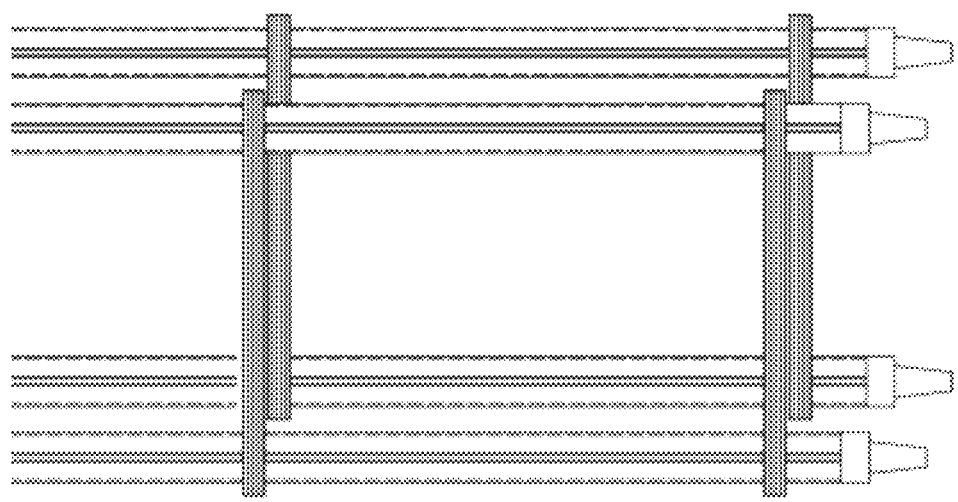
FIG. 31 is a side elevation of the effect of stacking the truss of the prior Figures with a slight inter-section offset to further reduce stack height.

FIG. 31 illustrates that, by slightly offsetting webs 40 in stacking truss sections, each section adds less than 3" to the stack height.

Methods of fabricating a web include casting, forging, or machining. A dimensional shape can be produced by braking edges, or be drawn, stamped, or hydro-formed.

Another fabrication method is to stack multiple layers of a thin flat stock, including as cut to shape by laser or by stamping. The overall size of a laminated web's layers can be reduced by dividing it into two or more sections, with the location of the boundary between them alternated in successive layers.

A hybrid construction is also possible, in which a web is assembled from more than one component, and, advantageously, can employ different materials and/or fabrication techniques.

In FIG. 31, a "laminated" construction reduces part size by dividing a layer into two or more parts (e.g., 40A and 40B), with the location of the boundary between them alternated from layer to layer for strength.

Figure 32:
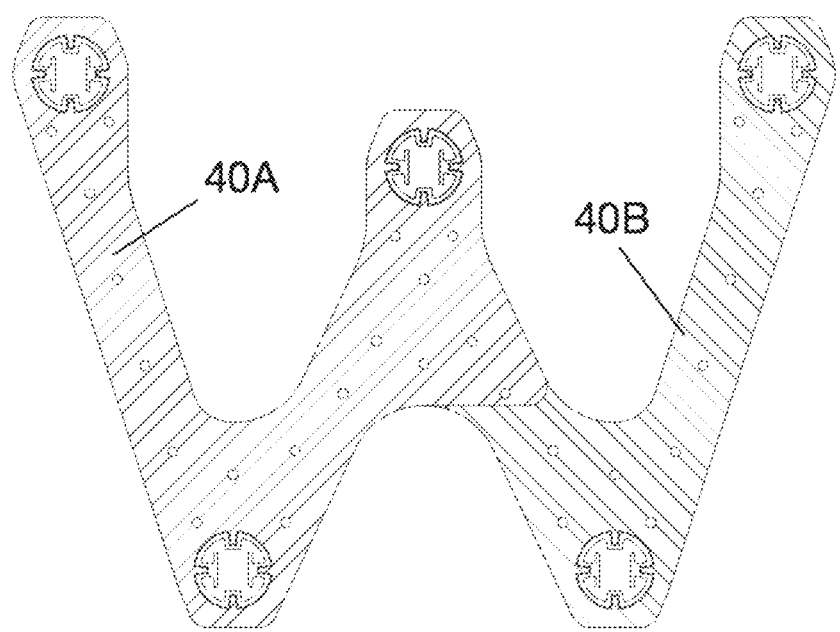
FIG. 32 illustrates a generally planar web assembled from plural elements.
Figures 33A, 33B:
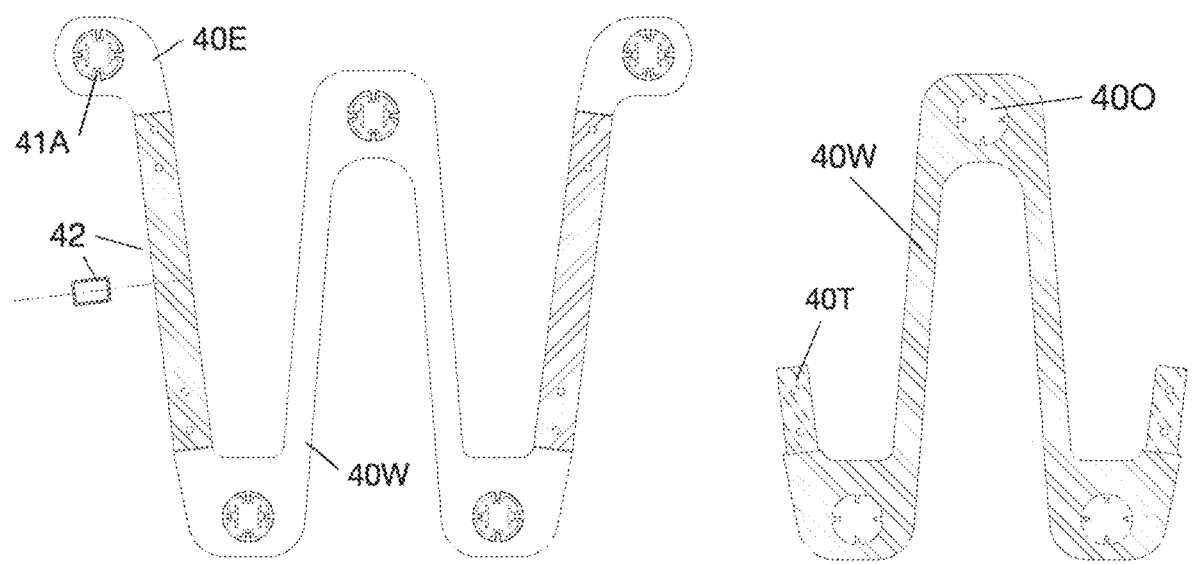
FIG. 33A illustrates another generally planar web assembled from plural elements.
FIG. 33B illustrates the central element in the web of the prior Figure.
Figures 34A, 34B, 34C, 34D:
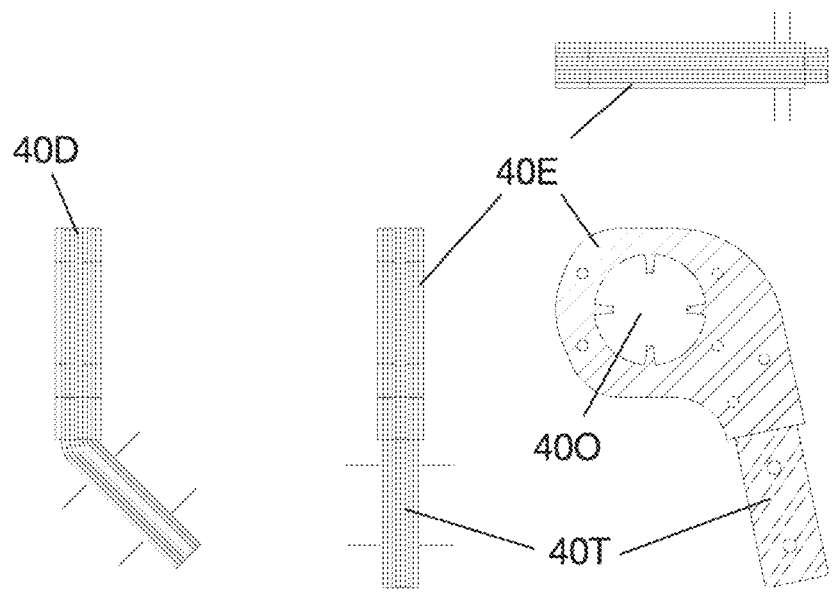
FIG. 34A is a side elevation of another element of the web of the prior Figure formed for an angular connection at the chord.
FIG. 34B is a side elevation of another element of the web of the prior Figure formed for a perpendicular connection at the chord.
FIG. 34C is an end elevation of the another element of the prior Figures.
FIG. 34D is a plan view of the another element of the prior Figures.

In FIG. 32, three of the five chords are connected by a common element 40W. The outer chords (e.g., 41A) are connected by common element 40W by tubing 42. A fitting 40E connects the tubing 42 with outer chords (e.g., 41). Element 40W and fitting 40E include a portion 40T for attachment to tubing 42. An example such fitting 40E is illustrated in FIGS. 34A-D as stacked plate, although many other methods of fabrication are clearly possible. As illustrated, fittings can be fabricated for cross members oriented at right angles to the chord as well as for diagonals (e.g., 40D).

Figure 35:
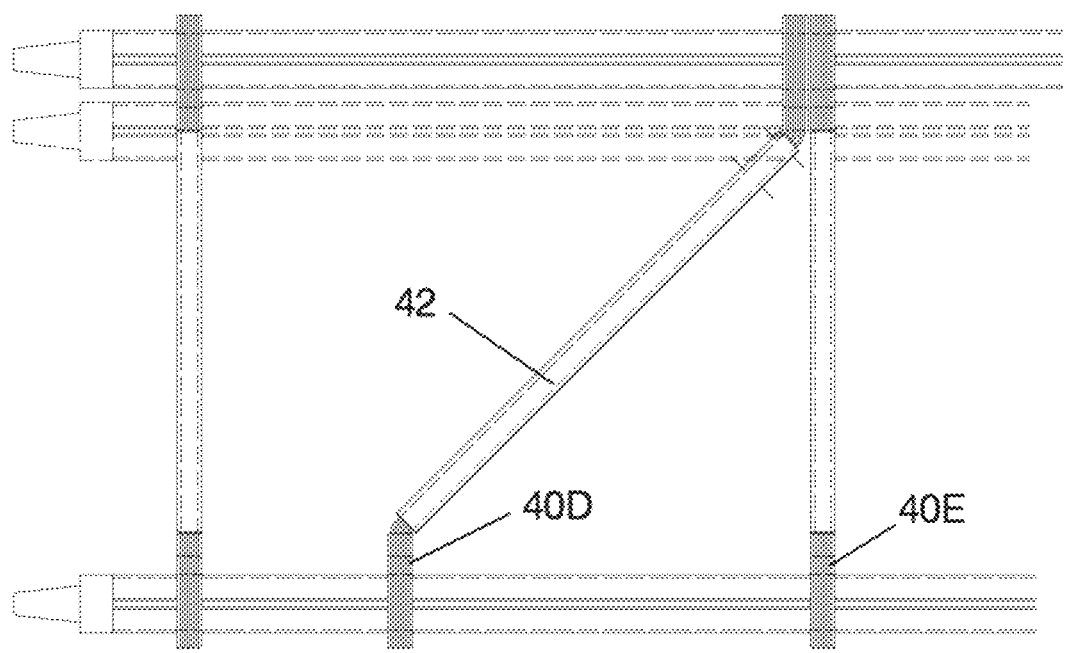
FIG. 35 is a side elevation of a truss employing the elements of the prior Figures illustrating the proximity practical between cross member connections to a chord.

FIG. 35 illustrates that, unlike welded cross members, webs and/or fittings such as 40D and 40E can be designed that allow connections of cross members to chords in close proximity with each other, such that longer spans of a truss's chords are unobstructed and remain available for the attachment of loads.

Also in prior related filings, a shape was disclosed that allows for the assembly of many different structures by attachment of cross members to chords, either directly or by way of an intermediate fitting.

Figure 36A:
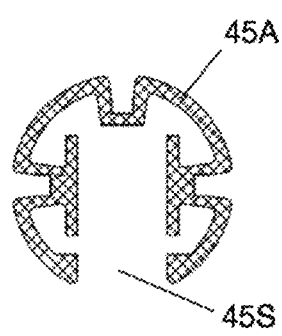
FIG. 36A is a section through a structural shape providing a channel for insertion of cross members.
Figure 36B:
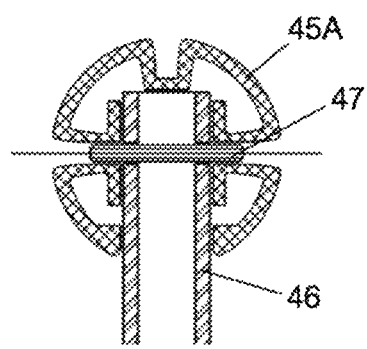
FIG. 36B is a section through a structural shape illustrating insertion and attachment of such a cross member.
Figure 36C:
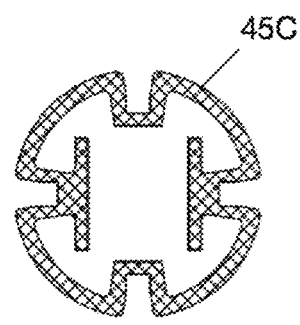
FIG. 36C is a section through a structural shape in which select openings for insertion of cross members can be made.

FIGS. 36A-36C illustrate an example structural shape. The shape 45A of FIG. 36A provides a continuous channel 45S for insertion of a cross member (or other element). FIG. 36B illustrates such an insertion with the cross member 46 mechanically fastened by roll pin 47, although other methods including welding or bonding are available. The example shape is stiffened by various features for increased capacity; buttresses the inserted member; and includes smaller channels for recessing fasteners and for radially aligning compatible clamps and hangers as previously disclosed.

Figures 37A, 37B, 37C:
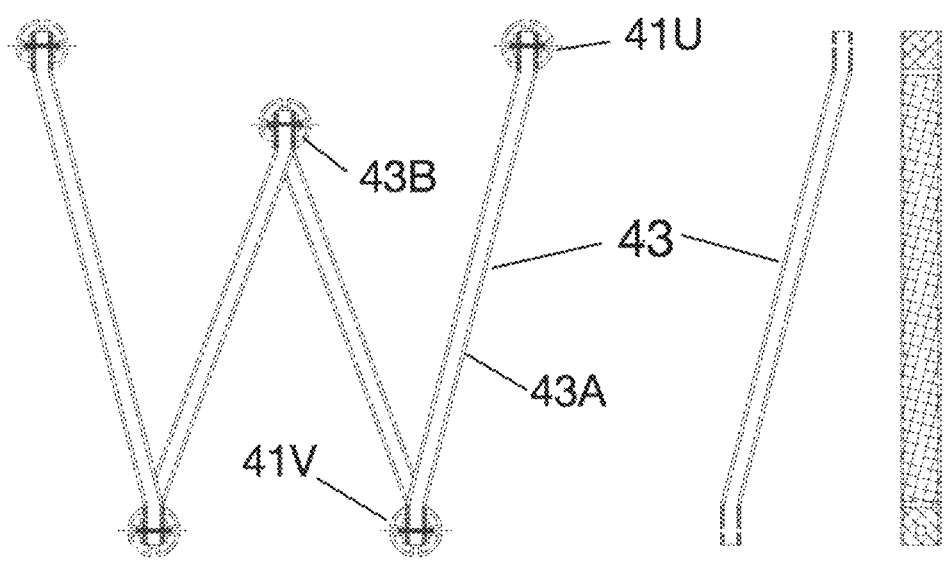
FIG. 37A is a section through a five-chord truss employing a shap of the type illustrated in the prior Figures.
FIG. 37B is an endwise elevation of a cross member used in the five-chord truss illustrated in the prior Figure.
FIG. 37C is a side elevation of a cross member used in the five-chord truss illustrated in FIG. 37A.
Figure 38:
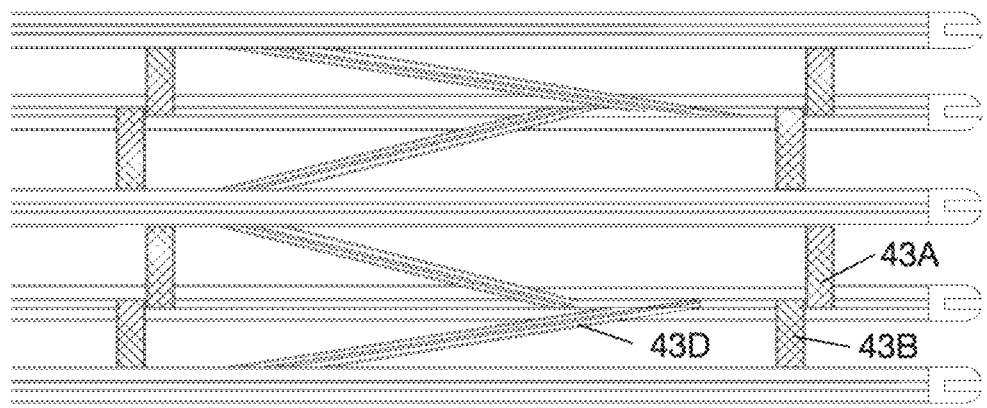
FIG. 38 is a plan view of the five-chord truss illustrated in FIG. 37A illustrating an offset between cross member connections to the chord.
Figure 39:
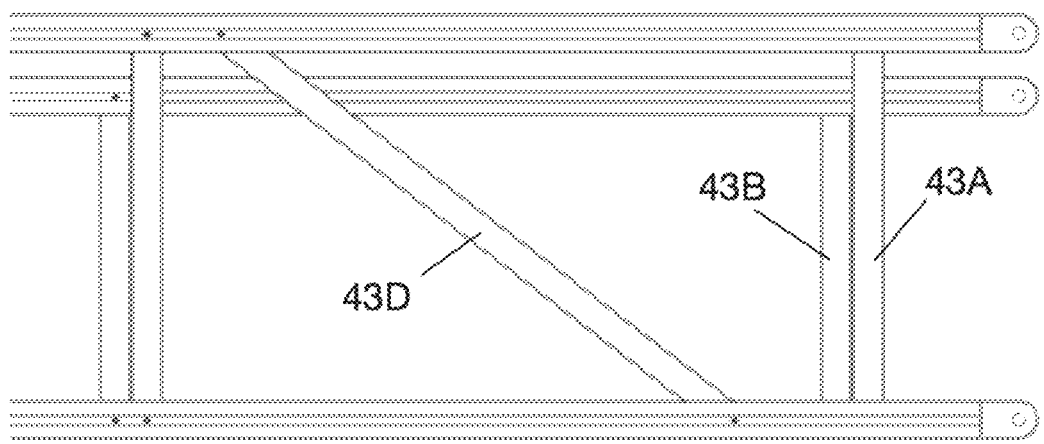
FIG. 39 is side elevation of the five-chord truss of the prior Figures illustrating an offset between cross member connections to the chord.

As previously disclosed in related applications, various methods of connecting cross members and other elements with such a shape are possible, including fittings. Angular transitions can be made by a fitting or by an angular transition in the cross member. In FIGS. 37A-37C, cross members 43 are bent or formed to produce the desired angle while maintaining the chord's small channels all radially aligned with plumb and horizontal.

Fittings are a method of connecting two cross members or other elements with a chord at the same location. FIGS. 37A-39 illustrate that a slight offset along the elongated axis of the chord allows a simple, direct connection by two cross members at substantially the same location (e.g., 43A and 43B).

Figure 40A:
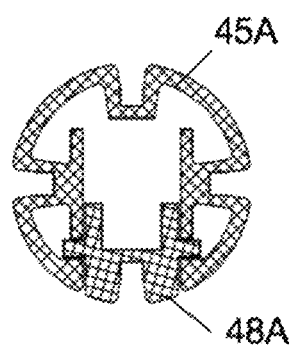
FIG. 40A is a section through the structural shape of FIG. 36A illustrating use of a second shape suitable for filling the open channel.
Figure 40B:
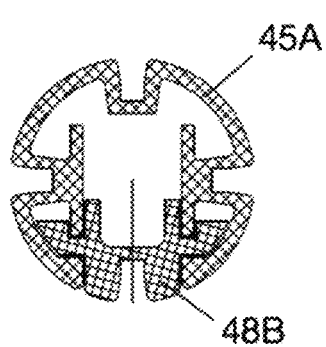
FIG. 40B is a section through the structural shape of FIG. 36A illustrating use of a second shape suitable for filling the open channel and providing reinforcement.
Figure 40C:
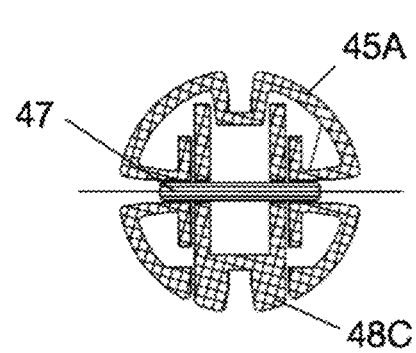
FIG. 40C is a section through the structural shape of FIG. 36A illustrating use of another second shape suitable for filling the open channel and providing reinforcement.

FIGS. 40A-40C illustrate some of many possible methods of closing the open channel in a basic shape where it is not necessary for a cross member connection or for another purpose. FIG. 40A illustrates one filler shape 48A. FIG. 40B illustrates another filler shape 48B interlocking with the basic shape in a manner that provides reinforcement/chord stiffening. FIG. 40C illustrates a filler shape 48C being mechanically attached to the basic shape.

Alternatively, FIG. 36C illustrates a closed basic shape 45C in which openings are made where required.

Also previously disclosed have been improvements to those trusses joined with pinned clevis or "spigot" fittings whose narrow profile makes hammer-driving pins out of the fittings difficult or impossible. An elongated pin has been disclosed extending through the fittings on both sides of a truss, such that it can be driven out from the truss exterior. To speed pin extraction, different pin diameters at the two fittings quickly relieve clearances near the start of pin travel. The prior illustrated embodiments also enlarged the fitting(s) and moved them interior to one of the truss sections.

In other alternatives, the same advantages can also be gained with more conventional clevis fittings that are attached coaxial with the truss chords. FIGS. 41A-41D illustrate a truss section end using a single pin to close two clevis fittings 50 and 51, improved using a multi-diameter pin 52 and differing hole sizes 50h and 51h in the two devises. When fully inserted, the end of pin 52 projects beyond the truss chord. It can be covered, including by a cap, which might also serve to captivate the pin, as do prior art "R clips". When recessing the end of the pin within the truss profile is preferred, an offset fitting can be employed, illustrated as 53 in FIGS. 42A-42D.

Other prior disclosures relate to "pre-rig" trusses.

The term identifies a truss whose structure, at least during shipping, encloses and protects lighting fixtures and other supported appliances, allowing them to remain attached and at least partially cabled, drastically reducing, relative to shipping fixtures separately, the time and labor required on site.

The "pre-rig" type was first employed with PAR64 fixtures on the Rolling Stones 1972 tour and, by the end of the decade, the touring industry had largely standardized on the James Thomas "PRT" design (and variants); a refined version of the 1972 truss operating on the same principle.

The introduction to the touring market in the early 1980s of "automated" lighting fixtures, as first disclosed in U.S. Pat. No. 3,845,351, required a different approach to pre-rig truss design. The first successful such design, disclosed in U.S. Pat. No. 4,837,665, was introduced in 1987.

The pursuit of a mechanically simpler truss structure resulted in a class of trusses in which a rigid truss has one open face from which the attached and enclosed fixtures partially extend. To permit shipping, the truss is temporarily raised on wheeled supports elevating and protecting the exposed fixture portions. In U.S. Pat. No. 8,517,397 and in Application No. US20130075993, the truss is landed atop a wheeled structure. In U.S. Pat. No. 8,099,913 to Dodd, two U-shaped "leg carriages" are attached to the truss. As disclosed and as manufactured for more than a decade as the "GT" truss by Tyler Truss Systems, the approach suffers from many problems which cost valuable time and labor.

Modern "pre-rig trusses" are generally dimensioned in width to permit shipping four sections side-by-side across a tractor-trailer. As such, only a single row of most popular fixtures will fit inside.

Figure 43A:
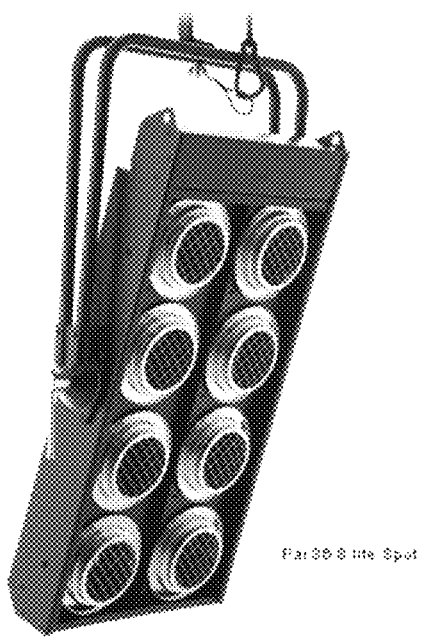
FIG. 43A is light fixture having eight PAR36 lamps often externally mounted to a truss for audience lighting.

Users have also long attached some fixtures externally on trusses of this and other types (for example, the eight PAR36 fixture in FIG. 43A, which is typically focused towards the audience, rather than the stage). Progress in LED technology has added many new fixtures in a variety of configurations. Fixtures are available both fixed in orientation (e.g., FIG. 44A) and motorized for remote changes in tilt (e.g., FIGS. 43B and 44B). As cited in the parent application, they are often mounted in quantity on the truss structure, entirely external to the volume it encloses.

The addition of dozens or even hundreds of such fixtures mounted externally to a "pre-rig" truss erodes much of its benefit. Such fixtures must be shipped separately in customized roadcases, unpacked individually (having in many cases separate brackets mounting clamps which must also be attached to the fixture), clamped to a truss chord at the correct radial angle, power and data connections made. As individually addressed devices sharing a serial data stream (such as DMX-512) with many other devices, each fixture must be hung and plugged at a specific location if it is to respond correctly. Thus, fixtures, their locations, and their connections must all be clearly labeled, and workers must take care to locate and plug them correctly. Prior to shipping to the next venue, each fixture must be unplugged, unclamped, and repacked in the appropriate roadcase.

Figure 46A:
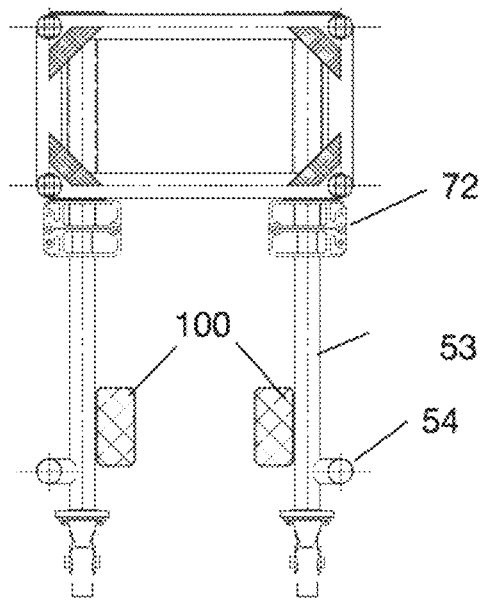
FIG. 46A is an end elevation of the subject matter of the prior Figure showing example leg hinge assemblies and one such linear light fixture attached to each leg carriage, the leg carriages in the shipping position.
Figure 46B:
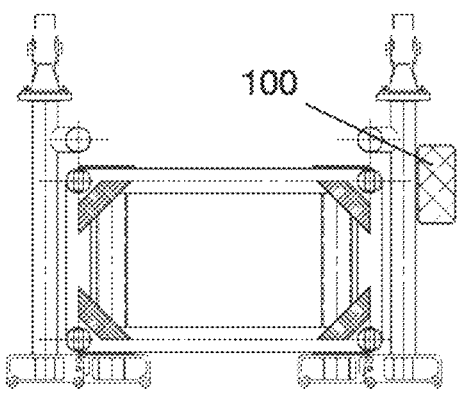
FIG. 46B is an end elevation of the subject matter of the prior Figures showing the leg carriages rotated upwards.
Figure 47A:
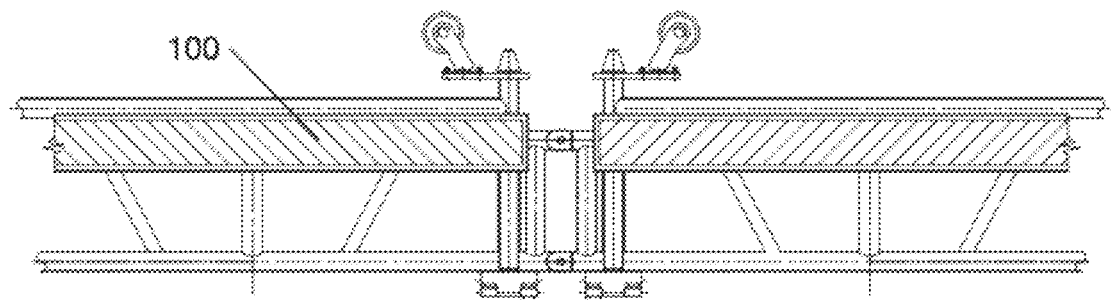
FIG. 47A is a partial side elevation of the prior Figure showing the light emitting side of the linear light fixture.
Figure 47B:
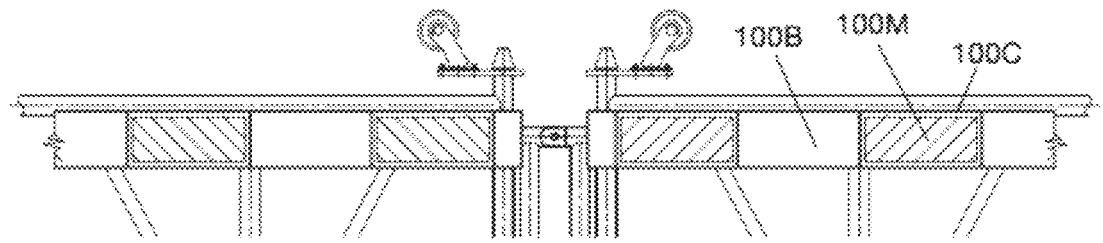
FIG. 47B is a partial side elevation of the prior Figure showing the linear light fixture as a chassis supporting light modules and blank spacer panels.

Prior related applications have disclosed solutions to various issues with the Dodd/Tyler truss, including, issued as U.S. Pat. No. 10,214,904, with a hinged connection between the leg carriage and the truss. Rather than requiring removal and storage of the leg carriages (on or off the truss section), the leg carriage is simply swung upwards (as seen in FIGS. 46A and 46B).

Prior related disclosures have also addressed issues with the addition of those fixtures that cannot ship on a truss section in their position of use. This includes attachment of individual fixtures to the horizontal structural member of a leg carriage, and the use of an elongated horizontal structural member providing an internal volume in which light sources can be accommodated. Illustrated herein is another variant in which a light-emitting structure spans between the vertical legs to which it is attached, one independent of the low horizontal rail of a leg carriage.

Referring now to FIGS. 45-47B, in only one of many possible embodiments, a linear fixture 100 is illustrated as spanning between the legs (e.g., leg 53) of a leg carriage. The fixture 100 can be clamped or otherwise attached to the legs (and/or to the low horizontal rail 54). It will be seen from FIGS. 46A and 46B that fixtures 100 are protected during shipping by the low horizontal rail 54, and because their light emitting side is towards the interior, but, when the leg carriage is rotated upwards, their light emitting side faces outwards. Attachment to the carriage legs allows fixture use with the existing inventory of such carriages; rapidly adding or removing fixtures as the need arises; as well as changing their location along the length of a leg. Fixtures can also be attached to the truss section itself. And fixtures can be made available in different lengths, heights, depths, and profiles, depending upon desired appearance and the light sources, optics, and mechanisms enclosed.

In some embodiments, the light fixture 100 can be an integrated unit, accepting power and data as do the fixtures of FIGS. 43B-44B. It is also practical to offer a structural chassis, in which different "light modules" having different light sources, configurations, optics, and additional elements and mechanisms can be mounted, either to form a substantially continuous appearance (e.g., FIG. 47A), one spaced apart (e.g., modules 100M by filler panels 100B in chassis 100C of FIG. 47B). Module types can be mixed along a chassis.

Figure 48A:
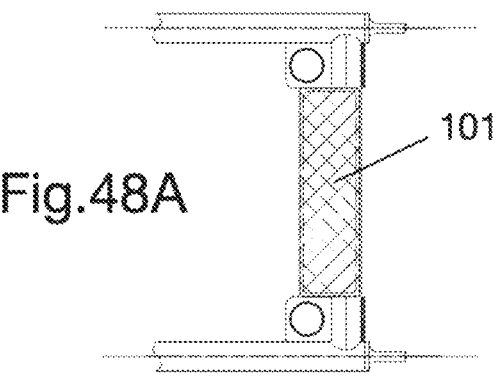
FIG. 48A is a sectional view in plan orientation of a truss section end with a power supply configured for internal mounting installed.
Figure 48B:
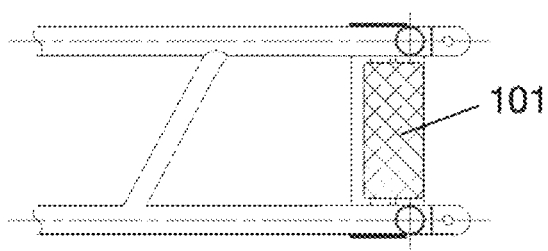
FIG. 48B is a sectional view in side elevation orientation of a truss section end with a power supply configured for internal mounting installed.
Figure 48C:
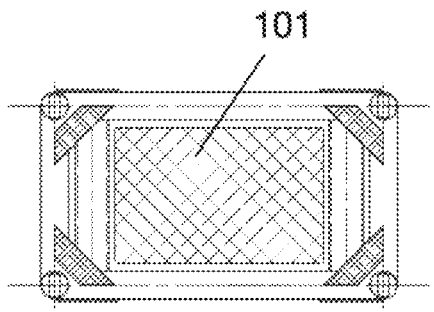
FIG. 48C is an end elevation of a truss section end with a power supply configured for internal mounting installed.

The size and weight of such a fixture or modular system can be reduced by exporting at least some of the power supply functions to a separate enclosure remaining mounted to the truss structure. FIGS. 48A-48C illustrate one embodiment in which such a "service module" 101 can be mounted in a truss end, where it has essentially no impact on accommodating fixtures within the truss proper. Further, the same service module can be used with a plurality of different fixtures and/or modules in a chassis, at a substantial cost savings to the user.

Fixtures such as those of FIGS. 43B-44B are also made larger, more complex, and more expensive by the operator interface necessary to set address, mode, and for other purposes, as well as by related connectors. By contrast, digital data can be connected to the "service module", from which it can be more efficiently distributed to a fixture or fixtures proper and/or to all modules in a chassis. The connection of a fixture or modules in a chassis to a "service module" can result in configuration information being communicated upstream, including using the established "RDM" protocol, as well as auto-configuration, for example of the plural modules of FIG. 47B to sequential addresses and the same mode. Advantages accrue as duplication is eliminated. A handheld pendant could be plugged to the "service module" or wirelessly connected. A personal electronic device such as a smartphone or tablet could serve as an interface with the appropriate application.

"Service modules" can be offered in different capacities and can be mounted in other truss types, with which fixtures and/or chassis (single or multiple module versions and in different configurations/dimensions and attachment methods) can also be used.

The location illustrated for the "service module" can also desirably be used for a chain motor "distro" as previously described.

Figure 49A:
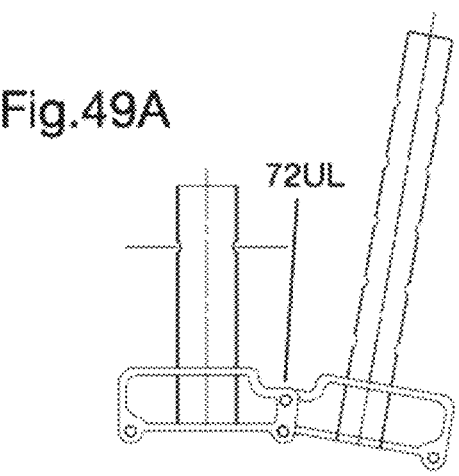
FIG. 49A is an end elevation of a hinge adaptor in a use position less than vertical.
Figure 49B:
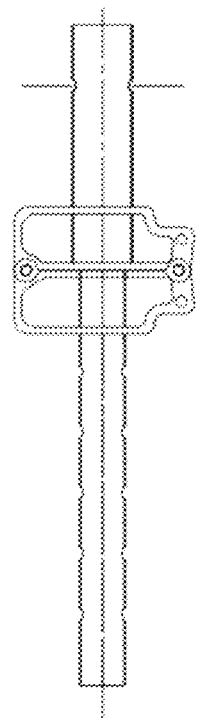
FIG. 49B is an end elevation of a hinge adaptor in shipping position.
Figure 49C:
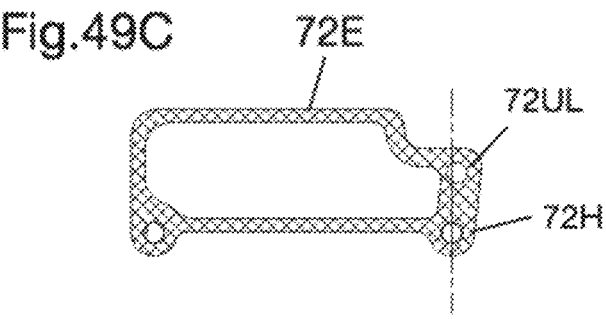
FIG. 49C is a section through a structural shape suitable for use in a leg hinge adaptor with a locking hole located for a use position of less than vertical.

FIGS. 49A-49C illustrate an example shape 72E for a leg carriage hinge adaptor 72 designed such that the upward, use position is at an angle less than vertical, such that the clearance between the low horizontal rail 54 of the leg carriage and the top chord is increased. Multiple angles can be provided, if desired.

Improvements can be made in fixture design, including in the type of configuration shown.

Figure 43B:
FIG. 43B is light fixture having an array of multi-colored LED emitters as well as a central line of white LEDs behind a cylindrical lens used for strobing.
Figure 44A:
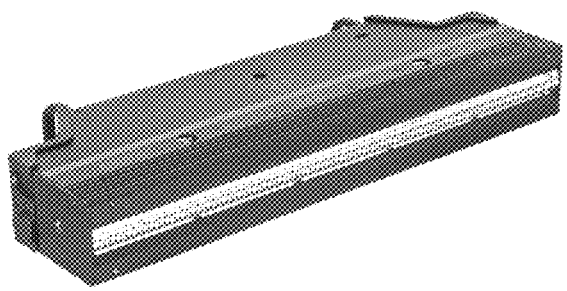
FIG. 44A is a multi-color linear LED light fixture mounted in a fixed orientation.

Fixtures such as that in FIG. 43B produce a broad wash of light. As "eye candy" (meaning, as visual elements themselves, providing accents in a scene when viewed directly) the matrix of LED emitters in these as some other fixtures are divided into sections which can be separately addressed. Thus, patterns can be produced across the light emitting face of the fixture. Another configuration is illustrated in FIG. 44A.

Figure 44B:
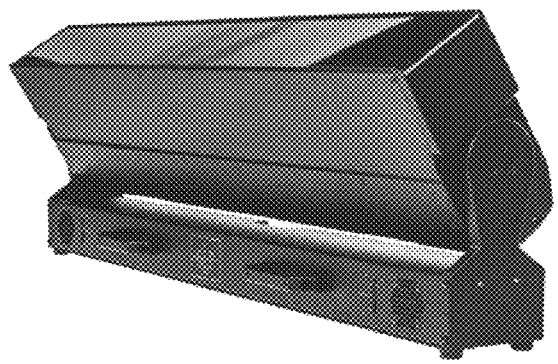
FIG. 44B is a multi-color linear LED light fixture motorized for remote tilt adjustment and having a motorized vari-focal lens system.
Figure 45:
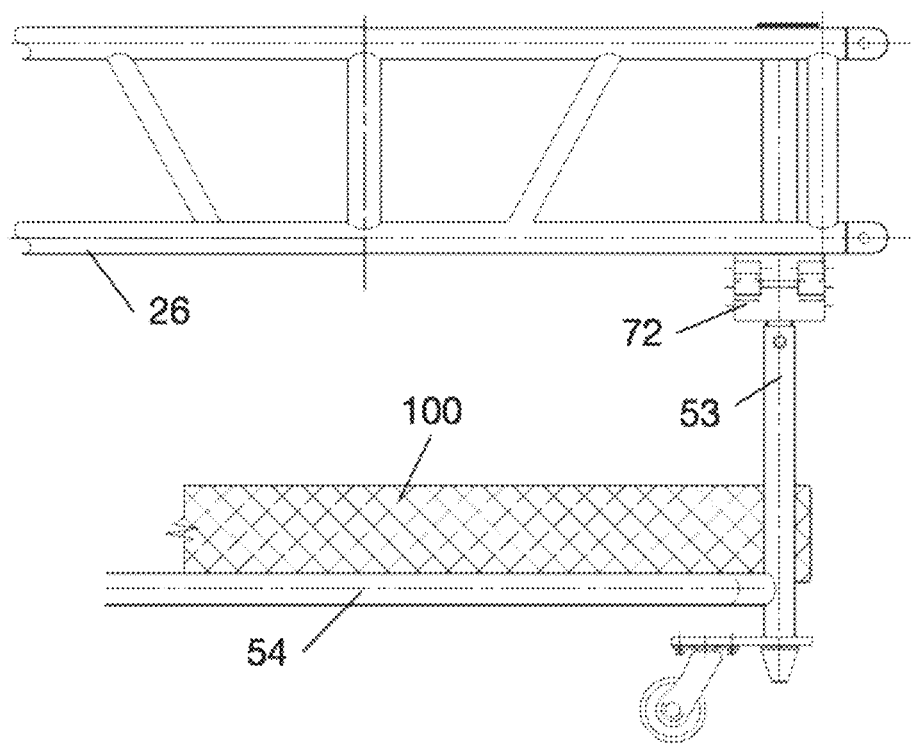
FIG. 45 is a partial side elevation of a linear light fixture that may be attached to the vertical legs of a leg carriage, which is shown here in shipping position.

The fixture of FIG. 44B contains a relatively small number of very powerful emitters, each provided with a relatively large circular lens, all on a common support motorized to change distance from the emitter and thereby beam spread. The fixture can thus form a planar beam of light aligned with its elongate axis and vary beam spread perpendicular thereto. The fixture head (like that of the fixture of FIG. 43B) is also motorized to tilt under remote control.

In the case of either fixture type, the moving head increases the weight, cost, and complexity of the fixture. Accessory mechanical locks are required to prevent undesirable head motion during handling and shipping, in turn requiring additional labor, which might not prove be locked or unlocked when appropriate, and are subject to breakage and wear.

It is therefore desirable to produce a light beam variable in spread and direction perpendicular to an elongate axis without the requirement for mechanization.

Figures 50A, 50B:
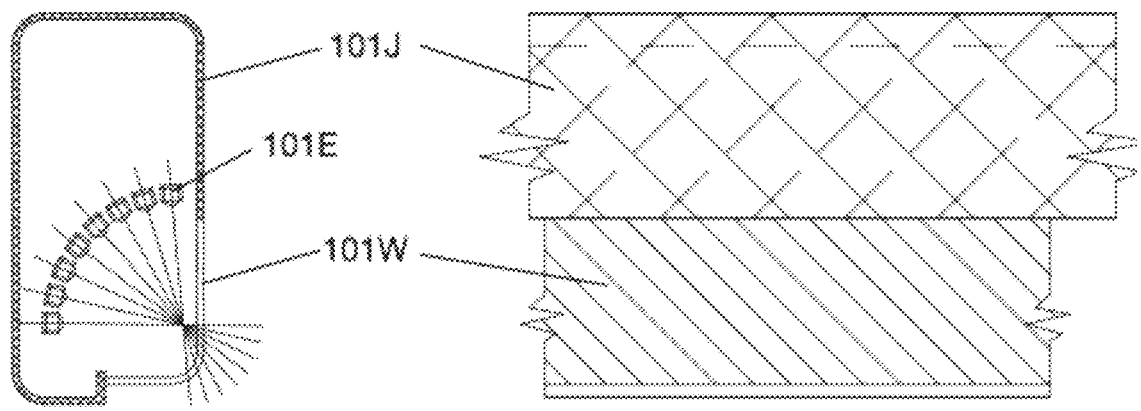
FIG. 50A is a section of a light fixture with a curved array of emitters which may be used to produce both wide and narrow beams and to produce a moving beam effect.
FIG. 50B is a side elevation of the fixture of the previous Figure on the light emitting side.

Referring now to FIGS. 50A and 50B, rows of directional emitters 101E are arrayed in a concave shape, such that the radial angle relative to the elongate axis of the fixture is varied. It will be seen that illuminating only the emitters in one row will produce a narrow, planar beam; the row chosen determining the radial angle relative to the fixture. Sequencing through rows produces the appearance of a moving beam with no moving parts. Sequences can "skip around" between rows and thereby angle. Illuminating increasing numbers of rows produces a progressively wider beam. And rows or groups of rows can be varied in intensity and color along the elongate axis of the fixture to "flow" light, color, and patterns linearly.

Fixture 100J employs a concave emitter form, although convex or other shapes are equally possible. A protective window 100W is provided. Lenses can be employed. And mirrors or prisms can be used in redirection.

The foregoing disclosure presents various embodiments and examples, which should not be understood as limiting the scope of the claims.

What is claimed is:

1. Apparatus suitable for supplying three-phase power to each of a plurality of chain motors, said apparatus comprising:
    an enclosure, said enclosure including:
        a 19-contact input connector accepting six alternating-current circuits of two phases each,
        a plurality of output connectors suitable for connection to a chain motor, each such output connector supplied with three-phase power from said alternating current circuits,
        means for remotely switching said power outputs.

2. Apparatus suitable for supplying three-phase power to each of a plurality of chain motors, said apparatus comprising:
    an enclosure, said enclosure including:
        a power input connector of a current rating, said power connector accepting one alternating-current supply of three phases,
        a plurality of three phase overcurrent protection means, said overcurrent protection means each having a current rating of less than the current rating of said power input connector,
        a plurality of output connectors suitable for connection to a chain motor, said output connectors supplied from said power input connector via one of said overcurrent protection means, a plurality of means for remotely switching said power as supplied to said output connector, said means connected between a said overcurrent protection means and said output connector.

\* \* \* \* \*